United States Patent
Ishiyama

(10) Patent No.: US 8,791,880 B2
(45) Date of Patent: Jul. 29, 2014

(54) SYSTEM, METHOD AND PROGRAM FOR SPECIFYING PIXEL POSITION CORRESPONDENCE

(75) Inventor: Rui Ishiyama, Minato-ku (JP)

(73) Assignee: NEC Corporation, Tokyo (JP)

( * ) Notice: Subject to any disclaimer, the term of this patent is extended or adjusted under 35 U.S.C. 154(b) by 609 days.

(21) Appl. No.: 13/127,157

(22) PCT Filed: Nov. 5, 2009

(86) PCT No.: PCT/JP2009/005869
§ 371 (c)(1),
(2), (4) Date: May 2, 2011

(87) PCT Pub. No.: WO2010/055625
PCT Pub. Date: May 20, 2010

(65) Prior Publication Data
US 2011/0216051 A1 Sep. 8, 2011

(30) Foreign Application Priority Data
Nov. 17, 2008 (JP) .................... 2008-293535

(51) Int. Cl.
G09G 3/30 (2006.01)
(52) U.S. Cl.
USPC .......................................... 345/32; 382/254
(58) Field of Classification Search
USPC ............................... 345/30, 32; 382/154, 254
See application file for complete search history.

(56) References Cited

U.S. PATENT DOCUMENTS

| 6,421,629 | B1 | 7/2002 | Ishiyama |
| 2005/0280831 | A1* | 12/2005 | Fujiwara et al. |

FOREIGN PATENT DOCUMENTS

| JP | 62-200207 A | 9/1987 |
| JP | 04-278406 A | 10/1992 |
| JP | 2001-012925 A | 1/2001 |
| JP | 2001-83949 A | 3/2001 |
| JP | 2004-264249 A | 9/2004 |
| JP | 3709395 B2 | 10/2005 |
| JP | 2006-033357 A | 2/2006 |
| JP | 2006-221599 A | 8/2006 |
| JP | 2007-142495 A | 6/2007 |
| JP | 3951984 B2 | 8/2007 |

OTHER PUBLICATIONS

Notification for Reasons for Refusal dated Mar. 26, 2013 issued by the Japanese Patent Office in corresponding Japanese Patent Application No. 2010-537676.

* cited by examiner

Primary Examiner — Regina Liang
(74) Attorney, Agent, or Firm — Sughrue Mion, PLLC

(57) ABSTRACT

When an image is projected on an arbitrary projection screen, correspondence between pixels in the image to be projected and pixels in projection means is specified. Reference pattern image group generating means 73 generates a reference pattern image group formed from images for each of which a luminance value defined as a function value of a continuous function which continuously changes with changes in phase is determined by varying the phase for each image, the image group being an image group having an initial phase value continuously varied on a coordinate-by-coordinate basis along one coordinate axis. Phase calculation means 75 calculates, from changes in luminance of pixels in a plurality of photographic images obtained by photographing each image of the reference pattern image group, the initial phase values that correspond to the changes in the luminance of the respective pixels in the photographic images. Associating means 76 conducts an inverse operation of a calculation instituted by the reference pattern image group generating means to derive initial phase values from coordinates, upon the calculated initial phase values, and then uses results of the inverse operation to specify correspondence between pixels in the image to be projected and pixels in projection means 71.

14 Claims, 10 Drawing Sheets

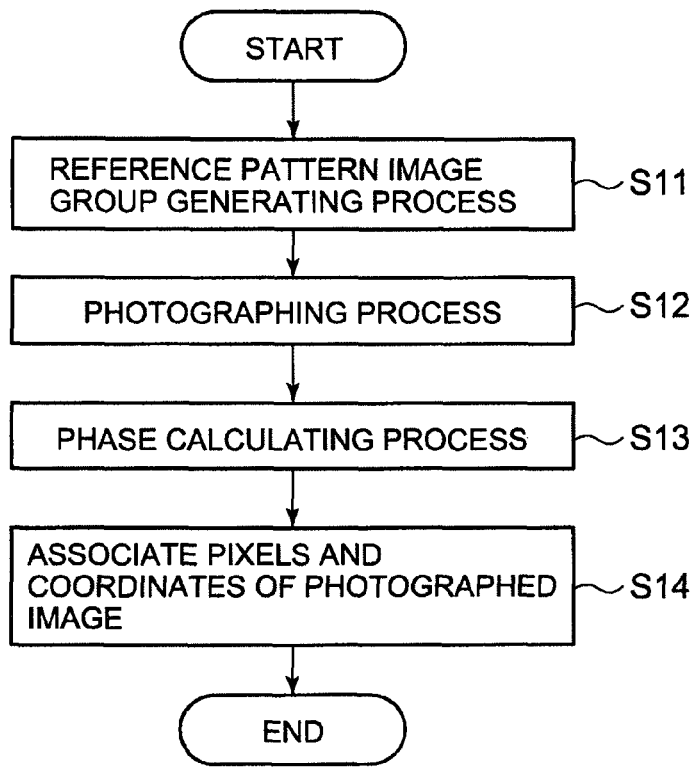
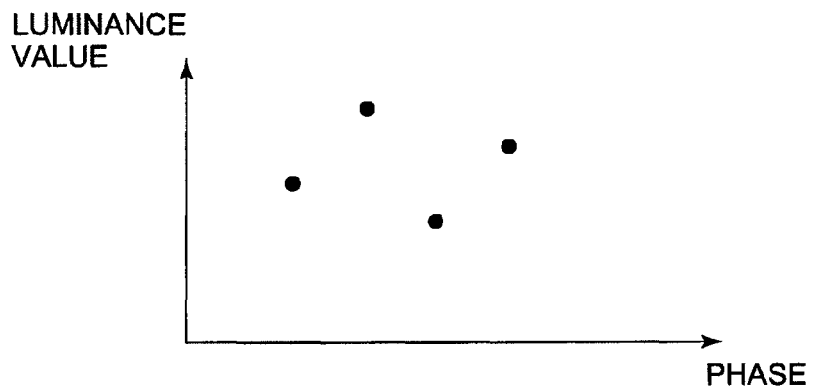

(a)

IMAGE TO BE PROJECTED    PHOTOGRAPHED IMAGE (100,    )                (50,  150)

⋮                         ⋮

(b)

IMAGE TO BE PROJECTED    PHOTOGRAPHED IMAGE (100,  50)                (50,  150)

⋮                         ⋮

SYSTEM, METHOD AND PROGRAM FOR SPECIFYING PIXEL POSITION CORRESPONDENCE

CROSS REFERENCE TO RELATED APPLICATIONS

This application is a National Stage of International Application No. PCT/JP2009/005869 filed Nov. 5, 2009, claiming priority based on Japanese Patent Application No. 2008-293535 filed Nov. 17, 2008, the contents of all of which are incorporated herein by reference in their entirety.

TECHNICAL FIELD

The present invention relates generally to systems, methods and programs for specifying pixel position correspondence between one image and another image, and to systems and programs for correcting an image. In particular, the invention concerns a system, method and program for specifying pixel position correspondence between an image to be projected and an image in projection means, and to a system and program for correcting image distortion in accordance with the correspondence.

BACKGROUND ART

For image projection on a general planar projection screen, the image projected will suffer distortion unless the projector is placed in a predesigned position relative to that of the projection screen. Standard types of projectors have a function that corrects the distortion. The projectors use this distortion-correcting function to counteract the distortion by deforming the unprojected image inversely to the distortion (image deformation) caused by the projection from a non-assumed position or direction, and then projecting the image whose distortion has been corrected by the deformation. To implement this function, it is necessary to acquire beforehand the mappings that represent a shape of the projection screen and the deformation level of the image that is dictated by a posture and a positional relationship between the projection screen and the projector. The deformation level here refers to how far from current positions the pixels in the image projected will deviate when the image is actually projected.

Various methods are proposed for acquiring the mappings. The techniques utilizing the fact that the mappings become the projective transformation determinable with a minimum number of parameters are proposed for a planar projection screen, in particular. Examples of these techniques are by manually entering positions at four corners of the image, or by projecting a test pattern and then after automatically detecting a marker, edges of the image, edges of the screen, or the like, from a camera-acquired image of the projected test pattern, calculating the parameters relating to the projective transformation. Patent Document 1 describes a method used to project an image by acquiring one piece of information on a distance between the projector and the screen, then estimating, from the acquired distance information and a shape of the screen, mutual distances between four corner positions on the screen, and after correcting the shape of the screen, deforming the image to be projected, according to the corrected screen shape.

Patent Document 2 describes an image projection system that obtains high-resolution projection images by detecting feature points very accurately with a laser pointer or the like, or by sequentially updating parameter settings relating to tilting, rotation, and shifting.

Patent Document 3 describes a plane projection apparatus that uses a projection region and a planar projective transformation matrix to transform images geometrically. The transformation is conducted by: creating and projecting a predetermined pattern image, then determining, from a photographic image obtained by first photographing the projected image, points on the projected image that correspond to points on the photographic image, next after listing the thus-determined corresponding points, clustering the points of the photographic image on an in-space plane-by-plane basis using the planar projective transformation matrix derived from the listed corresponding points, and determining the projection region from the plane-by-plane clustered points on the photographic image.

Patent Document 4 describes a method of calculating parameters relating to a quadratic surface assumed beforehand as a shape of a projection screen. Patent Document 4 also describes a method of composite image generation, in which method, images from a plurality of projectors are represented in undistorted form on a quadratic surface screen. In the methods of Patent Document 4, a mapping function that represents correspondence between a first onscreen-projected point as viewed from a coordinate system of each projector, and the first onscreen-projected point as viewed from any assumed viewing point, and an inverse function are calculated and distortion is corrected using the inverse function that relates to mapping in each projector. During the calculation of the mapping function and the inverse function, a matrix M for conversion from a fundamental coordinate system into a viewing point coordinate system, and a matrix S for converting camera coordinates into the fundamental coordinate system are first used so that a matrix H for conversion from the viewing point coordinate system into the camera coordinate system will be obtained for predetermined test-pattern points projected on the quadratic surface screen from the projectors. The conversion matrix H is next used to calculate a quadratic surface parameter Qv in the viewing point coordinate system with the assumed viewing point as its origin, from a quadratic surface parameter Q derived in the camera coordinate system. The quadratic surface parameter Qv is used after that to calculate a mapping function that represents correspondence between a second onscreen-projected point as viewed from an i-coordinate system of the projector, and the second onscreen-projected point as viewed from another assumed viewing point, and then to calculate an inverse function from the mapping function.

CITATION LIST

Patent Literature

Patent Document 1 JP-3951984
Patent Document 2 JP-3709395
Patent Document 3 JP-A-2007-142495
Patent Document 4 JP-A-2006-221599

SUMMARY OF INVENTION

Technical Problem

However, distortion of an image projected on an arbitrary projection screen having complex surface irregularities, for example, cannot be corrected using any of the above techniques. For example, the method described in Patent Document 1 is effective for correcting distortion of a planarly projected image, but unsuitable if the projection screen has an arbitrary shape. For the same reason, the plane projection apparatus described in Patent Document 3 is also intended only for projection on a screen that partially includes planes. In addition, the method described in Patent Document 4 is only applicable to projection on a projection screen having a shape of a quadratic curve, and is therefore ineffective for correcting distortion of an image projected on a screen of an arbitrary shape.

To correct the distortion of an image, pixel positions in the image existing before being projected, and corresponding pixel positions in the image existing after being actually projected must be specified very accurately for each pixel. The above techniques, however, have been inapplicable to highly accurate correction of distortion, because of such pixel-based correspondence not being specifiable for projection screens of an arbitrary shape.

Accordingly, an object of the present invention is to provide a system, method and program for specifying pixel position correspondence between an image to be projected and an image in projection means when an image is to be projected on a projection screen of an arbitrary shape. Another object of the invention is to provide a system and program for correcting image distortion in accordance with specified correspondence.

Solution to Problem

A pixel position correspondence specifying system according to one aspect of the present invention includes: means that projects an image on a projection screen; means that photographs the image projected on the projection screen; means that generates reference pattern image groups each formed from images for each of which a luminance value defined as a function value of a continuous function which continuously changes with changes in phase is determined by varying the phase for each image, the image groups each being an image group having an initial phase value continuously varied on a coordinate-by-coordinate basis along one coordinate axis; photographing control means that controls the projection means to project the images belonging to the reference pattern image group, the control means further making the photographing means photograph each image resultingly projected on the projection screen; phase calculation means that calculates, from changes in luminance of a plurality of photographic images obtained by the photographing means when each image of the reference pattern image group is projected by the projection means, the initial phase values that correspond to changes in luminance of respective pixels in the photographic images; and associating means that conducts, upon the initial phase values calculated by the phase calculation means, an inverse operation of a calculation instituted by the reference pattern image group generating means to derive initial phase values from coordinates, then associates the pixels in the photographic images and the coordinates obtained by the inverse operation, and thus specifies correspondence between pixels in the image to be projected and the pixels in the projection means; wherein: the reference pattern image group generating means generates a reference pattern image group concerning a first coordinate axis along which initial phase values are varied, and a reference pattern image group concerning a second coordinate axis along which an initial phase value is changed; the photographing control means controls the projection means to project the reference pattern image group concerning the first coordinate axis, and controls the photographing means to photograph each image of the reference pattern image group resultingly projected on the projection screen, the photographing control means further making the projection means project the reference pattern image group concerning the second coordinate axis, and making the photographing means photograph each image of the reference pattern image group resultingly projected on the projection screen; the phase calculation means calculates, from changes in luminance of a plurality of photographic images obtained by the photographing means when each image of the reference pattern image group for the first coordinate axis is projected by the projection means, the initial phase values corresponding to the changes in the luminance of the respective pixels in the photographic images, the phase calculation means further calculating, from changes in luminance of a plurality of photographic images obtained by the photographing means when each image of the reference pattern image group for the second coordinate axis is projected by the projection means, the initial phase values corresponding to the changes in the luminance of the respective pixels in the photographic images; and the associating means calculates coordinates of the first coordinate axis by conducting an inverse operation of a calculation for deriving initial phase values from the coordinates of the first coordinate axis, upon the initial phase values calculated from the photographic images obtained by photographing the reference pattern image group relating to the first coordinate axis, associates the coordinates of the first coordinate axis with the pixels in the photographic images, next after calculating coordinates of the second coordinate axis by conducting an inverse operation of a calculation for deriving initial phase values from the coordinates of the second coordinate axis, upon the initial phase values calculated from the photographic images obtained by photographing the reference pattern image group relating to the second coordinate axis, associates the coordinates of the second coordinate axis with the pixels in the photographic images, the associating means thus specifying correspondence between the pixels of each photographic image and those of each image projected by the projection means, and using the correspondence between the pixels and coordinates of the photographic image to specify the correspondence between the pixels in the image to be projected and the pixels in the projection means.

A pixel position correspondence specifying system according to another aspect of the present invention includes: means that projects an image on a projection screen; means that generates reference pattern image groups each formed from images for each of which a luminance value defined as a function value of a continuous function which continuously changes with changes in phase is determined by varying the phase for each image, the image groups each being an image group having an initial phase value continuously varied on a coordinate-by-coordinate basis along one coordinate axis; reference pattern projection control means that controls the projection means to project the images belonging to the reference pattern image groups; phase calculation means that calculates, from changes in luminance of pixels in a plurality of photographic images obtained by photographing each image of the reference pattern image group projected on the projection screen, the initial phase values that correspond to the changes in the luminance of the respective pixels in the photographic images; and associating means that conducts an inverse operation of a calculation instituted by the reference pattern image group generating means to derive initial phase values from coordinates, upon the initial phase values calculated by the phase calculation means, then associates the inversely calculated coordinates with the pixels in the photographic images, and thus specifies correspondence between pixels in the image to be projected and pixels present in the projection means, wherein: the reference pattern image group generating means generates a reference pattern image group concerning a first coordinate axis along which initial phase values are varied, and a reference pattern image group concerning a second coordinate axis along which initial phase values are varied; the reference pattern projection control means controls the projection means to project the reference pattern image group for the first coordinate axis, the projection control means further making the projection means project the reference pattern image group for the second coordinate axis; the phase calculation means calculates, from changes in luminance of pixels in a plurality of photographic images obtained by photographing each image of the reference pattern image group for the first coordinate axis, the initial phase values corresponding to the changes in the luminance of the respective pixels in the photographic images, the phase calculation means further calculating, from changes in luminance of pixels in a plurality of photographic images obtained by photographing each image of the reference pattern image group for the second coordinate axis, the initial phase values corresponding to the changes in the luminance of the respective pixels in the photographic images; and the associating means calculates coordinates of the first coordinate axis by conducting an inverse operation of a calculation for deriving initial phase values from the coordinates of the first coordinate axis, upon the initial phase values calculated from the photographic images obtained by photographing the reference pattern image group for the first coordinate axis, then associates the coordinates of the first coordinate axis with the pixels in the photographic images, next after calculating coordinates of the second coordinate axis by conducting an inverse operation of a calculation for deriving initial phase values from the coordinates of the second coordinate axis, upon the initial phase values calculated from the photographic images obtained by photographing the reference pattern image group for the second coordinate axis, associates the coordinates of the second coordinate axis with the pixels in the photographic images, the associating means thus specifying the correspondence between the pixels of each photographic image and those of the image to be projected by the projection means, and using the correspondence between the pixels and coordinates of the photographic image to specify the correspondence between the pixels in the image to be projected and the pixels in the projection means.

An image correction system according to yet another aspect of the present invention includes: means that corrects an image to be projected by projection means, on the basis of correspondence between pixels in the image to be projected and pixels in the projection means.

A pixel position correspondence specifying method according to a further aspect of the present invention includes the steps of: generating a reference pattern image group for a first coordinate axis, formed from images for each of which a luminance value defined as a function value of a continuous function which continuously changes with changes in phase is determined by varying the phase for each image, the image groups each being an image group having an initial phase value continuously varied on a coordinate-by-coordinate basis along the first coordinate axis; making projection means project the images belonging to the reference pattern image group for the first coordinate axis, and photographing means to photograph each image resultingly projected on a projection screen; calculating, from changes in luminance of pixels in a plurality of photographic images obtained by the photographing means when each image of the reference pattern image group for the first coordinate axis is projected by the projection means, the initial phase values that correspond to the changes in the luminance of the respective pixels in the photographic images; conducting, upon the initial phase values calculated from the changes in the luminance of the pixels in the photographic images, an inverse operation of a calculation instituted to derive initial phase values from coordinates of the first coordinate axis in the step of generating the reference pattern image group for the first coordinate axis, and then associating the pixels in each photographic image and the coordinates of the first coordinate axis obtained by the inverse operation; generating a reference pattern image group for a second coordinate axis, formed from images for each of which a luminance value defined as a function value of a continuous function which continuously changes with changes in phase is determined by varying the phase for each image, the image groups each having an initial phase value continuously varied on a coordinate-by-coordinate basis along the second coordinate axis; making the projection means project the images belonging to the reference pattern image group for the second coordinate axis, and the photographing means to photograph each image resultingly projected on the projection screen; calculating, from changes in luminance of pixels in a plurality of photographic images obtained by the photographing means when each image of the reference pattern image group for the second coordinate axis is projected by the projection means, the initial phase values that correspond to the changes in the luminance of the respective pixels in the photographic images; conducting, upon the initial phase values calculated from the changes in the luminance of the pixels in the photographic images, an inverse operation of a calculation instituted to derive initial phase values from coordinates of the second coordinate axis in the step of generating the reference pattern image group for the second coordinate axis, and then associating the pixels in each photographic image and the coordinates of the second coordinate axis obtained by the inverse operation; and using the correspondence between the pixels and coordinates in the photographic image to specify correspondence between pixels in the image to be projected and the pixels in the projection means.

A pixel position correspondence specifying method according to a further aspect of the present invention includes the steps of: generating a reference pattern image group for a first coordinate axis, formed from images for each of which a luminance value defined as a function value of a continuous function which continuously changes with changes in phase is determined by varying the phase for each image, the image groups each being an image group having an initial phase value continuously varied on a coordinate-by-coordinate basis along the first coordinate axis; making projection means project the images belonging to the reference pattern image group for the first coordinate axis; calculating, from changes in luminance of pixels in a plurality of photographic images obtained by photographing the images of the reference pattern image group for the first coordinate axis projected on a projection screen, the initial phase values that correspond to the changes in the luminance of the respective pixels in the photographic images; conducting, upon the initial phase values calculated from the changes in the luminance of the pixels in the photographic images, an inverse operation of a calculation instituted to derive initial phase values from coordinates of the first coordinate axis in the step of generating the reference pattern image group for the first coordinate axis, and then associating the pixels in each photographic image and the coordinates of the first coordinate axis obtained by the inverse operation; generating a reference pattern image group for a second coordinate axis, formed from images for each of which a luminance value defined as a function value of a continuous function which continuously changes with changes in phase is determined by varying the phase for each image, the image groups each having an initial phase value continuously varied on a coordinate-by-coordinate basis along the second coordinate axis; making the projection means project the images belonging to the reference pattern image group for the second coordinate axis; calculating, from changes in luminance of pixels in a plurality of photographic images obtained by photographing the images of the reference pattern image group for the second coordinate axis projected on the projection screen, the initial phase values that correspond to the changes in the luminance of the respective pixels in the photographic images; conducting, upon the initial phase values calculated from the changes in the luminance of the pixels in the photographic images, an inverse operation of a calculation instituted to derive initial phase values from coordinates of the second coordinate axis in the step of generating the reference pattern image group for the second coordinate axis, and then associating the pixels in each photographic image and the coordinates obtained by the inverse operation; and using the correspondence between the pixels and coordinates in the photographic image to specify correspondence between pixels in the image to be projected and the pixels in the projection means.

According to a further aspect of the present invention, a pixel position correspondence specifying program installed on a computer equipped with projection means to project an image on a projection screen and with photographing means to photograph the image projected on the projection screen, the program causing the computer execute: a first reference-pattern image group generating process for generating a reference pattern image group for a first coordinate axis, formed from images for each of which a luminance value defined as a function value of a continuous function which continuously changes with changes in phase is determined by varying the phase for each image, the image groups each being an image group having an initial phase value continuously varied on a coordinate-by-coordinate basis along the first coordinate axis; a first photographing control process for making the projection means project the images belonging to the reference pattern image group for the first coordinate axis, and the photographing means to photograph each image resultingly projected on the projection screen; a first phase calculation process for calculating, from changes in luminance of pixels in a plurality of photographic images obtained by the photographing means when each image of the reference pattern image group relating to the first coordinate axis is projected by the projection means, the initial phase values that correspond to the changes in the luminance of the respective pixels in the photographic images; a first associating process for conducting, upon the initial phase values calculated by the first phase calculation process, an inverse operation of a calculation instituted to derive initial phase values from coordinates of the first coordinate axis in the first reference-pattern image group generating process, and then associating the pixels in each photographic image and the coordinates of the first coordinate axis obtained by the inverse operation; a second reference-pattern image group generating process for generating a reference pattern image group for a second coordinate axis, formed from images for each of which a luminance value defined as a function value of a continuous function which continuously changes with changes in phase is determined by varying the phase for each image, the image groups each being an image group having an initial phase value continuously varied on a coordinate-by-coordinate basis along the second coordinate axis; a second photographing control process for making the projection means project the images belonging to the reference pattern image group for the second coordinate axis, and the photographing means to photograph each image resultingly projected on the projection screen; a second phase calculation process for calculating, from changes in luminance of pixels in a plurality of photographic images obtained by the photographing means when each image of the reference pattern image group relating to the second coordinate axis is projected by the projection means, the initial phase values that correspond to the changes in the luminance of the respective pixels in the photographic images; a second associating process for conducting, upon the initial phase values calculated in the second phase calculation process, an inverse operation of a calculation instituted to derive initial phase values from coordinates of the second coordinate axis in the second reference-pattern image group generating process, and then associating the pixels in each photographic image and the coordinates of the second coordinate axis obtained by the inverse operation; and a pixel associating process for using the correspondence between the pixels and coordinates in the photographic image to specify correspondence between pixels in the image to be projected and the pixels in the projection means.

According to a further aspect of the present invention, a pixel position correspondence specifying program installed on a computer equipped with projection means to project an image on a projection screen, the program causing the computer execute: a first reference-pattern image group generating process for generating a reference pattern image group for a first coordinate axis, formed from images for each of which a luminance value defined as a function value of a continuous function which continuously changes with changes in phase is determined by varying the phase for each image, the image groups each being an image group having an initial phase value continuously varied on a coordinate-by-coordinate basis along the first coordinate axis; a first reference-pattern projection control process for making the projection means project the images belonging to the reference pattern image group for the first coordinate axis; a first phase calculation process for calculating, from changes in luminance of pixels in a plurality of photographic images obtained by photographing each image of the reference pattern image group for the first coordinate axis projected on the projection screen, the initial phase values that correspond to the changes in the luminance of the respective pixels in the photographic images; a first associating process for conducting, upon the initial phase values calculated in the first phase calculation process, an inverse operation of a calculation instituted to derive initial phase values from coordinates of the first coordinate axis in the first reference-pattern image group generating process, and then associating the pixels in each photographic image and the coordinates of the first coordinate axis obtained by the inverse operation; a second reference-pattern image group generating process for generating a reference pattern image group for a second coordinate axis, formed from images for each of which a luminance value defined as a function value of a continuous function which continuously changes with changes in phase is determined by varying the phase for each image, the image groups each being an image group having an initial phase value continuously varied on a coordinate-by-coordinate basis along the second coordinate axis; a second reference-pattern projection control process for making the projection means project the images belonging to the reference pattern image group for the second coordinate axis; a second phase calculation process for calculating, from changes in luminance of pixels in a plurality of photographic images obtained by photographing each image of the reference pattern image group for the second coordinate axis projected on the projection screen, the initial phase values that correspond to the changes in the luminance of the respective pixels in the photographic images; a second associating process for conducting, upon the initial phase values calculated in the second phase calculation process, an inverse operation of a calculation instituted to derive initial phase values from coordinates of the second coordinate axis in the second reference-pattern image group generating process, and then associating the pixels in each photographic image and the coordinates of the second coordinate axis obtained by the inverse operation; and a pixel associating process for using the correspondence between the pixels and coordinates in the photographic image to specify correspondence between pixels in the image to be projected and the pixels in the projection means.

An image correction program according to a further aspect of the present invention controls a computer to execute, on the basis of correspondence between pixels in an image that projection means is to project and pixels in the projection means, a process for correcting the image to be projected.

Advantageous Effects of the Invention

According to the present invention, when an image is to be projected on a projection screen of an arbitrary shape, correspondence between pixels in the image to be projected and pixels in projection means can be specified.

BRIEF DESCRIPTION OF DRAWINGS

FIG. 6 It depicts a flowchart that shows an example of a flow of an associating process relating to x-coordinates;

FIG. 7 It depicts an explanatory diagram that shows an example of changes in luminance of the same pixel in a plurality of photographic images;

DESCRIPTION OF EMBODIMENTS

Hereunder, exemplary embodiments of the present invention will be described referring to the accompanying drawings.

First Exemplary Embodiment

Figure 1:
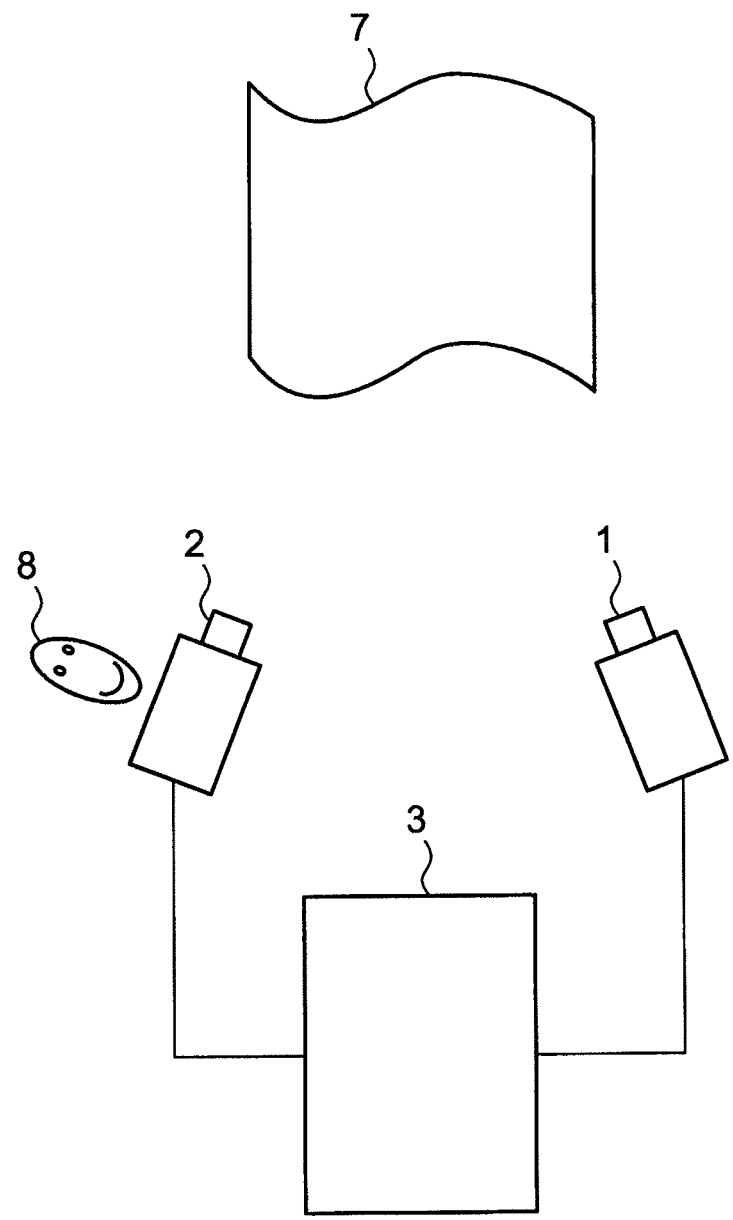
FIG. 1 It depicts a block diagram that shows an example of a pixel position correspondence specifying system according to a first exemplary embodiment of the present invention.

FIG. 1 is a block diagram that shows an example of a pixel position correspondence specifying system according to a first exemplary embodiment of the present invention. The pixel position correspondence specifying system according to the present exemplary embodiment specifies correspondence between positions of pixels in an image to be projected and those of pixels in projection 1. The image to be projected is that to be projected on a projection screen 7 of an arbitrary shape. The pixel position correspondence specifying system according to the present exemplary embodiment includes projection means 1 that projects an image on the projection screen 7 of an arbitrary shape, photographing means 2 that photographs an image that has been projected on the projection screen 7, and an information-processing apparatus 3 that associates the pixels in the image to be projected and pixels in the projection means 1. The projection means 1 is a projector, for example, and the photographing means 2 is a camera, for example.

The projection means 1 projects reference pattern image groups on the projection screen, under control of the information-processing apparatus 3. The reference pattern image groups will be described later herein. The projection screen 7 is of an arbitrary shape, hence distorting the image projected on the projection screen 7. The photographing means 2 photographs each reference pattern image group projected on the projection screen 7, from the same direction as that in which a viewer 8 views the projection screen 7 to watch the image. The images thus obtained by the photographing means 2 are hereinafter referred to as the photographic images. The information-processing apparatus 3 uses the reference pattern image groups and the photographic images to specify the correspondence between pixels in the image to be projected and those of one photographic image obtained by photographing one image actually projected on the projection screen. The information-processing apparatus 3 also uses the reference pattern image groups and the photographic images to specify the correspondence between the pixels in the image to be projected and pixels in the projection means 1.

An example in which the projection means 1 projects reference pattern images, one at a time, on the projection screen and the photographing means 2 photographs the images, one by one, is described in the present exemplary embodiment. The projection means 1, however, may project the images at the same time. Simultaneous projecting of multiple images by the projection means 1 will be described later herein.

After the correspondence between the pixels in the image to be projected and the pixels in the projection means 1 has been defined, the image that the projection means 1 projects for visual presentation to the viewer 8 undergoes correction based on the correspondence. This allows the viewer 8 to watch an undistorted image. The correspondence between pixels of images, used for such correction, is defined in the present exemplary embodiment.

Next, the reference pattern image groups are described below. The reference pattern image groups are formed from images for each of which luminance value defined as a function value of a continuous function which continuously changes with changes in phase is determined by varying the phase for each image, the image groups each being an image group having an initial phase value continuously varied on a coordinate-by-coordinate basis along one coordinate axis. The function defining the luminance value can be any function that continuously changes with changes in phase. An example of using a function which defines a sinusoidal form of changes in luminance with changes in phase (e.g., a sine function or the like) is described below.

Figure 2:
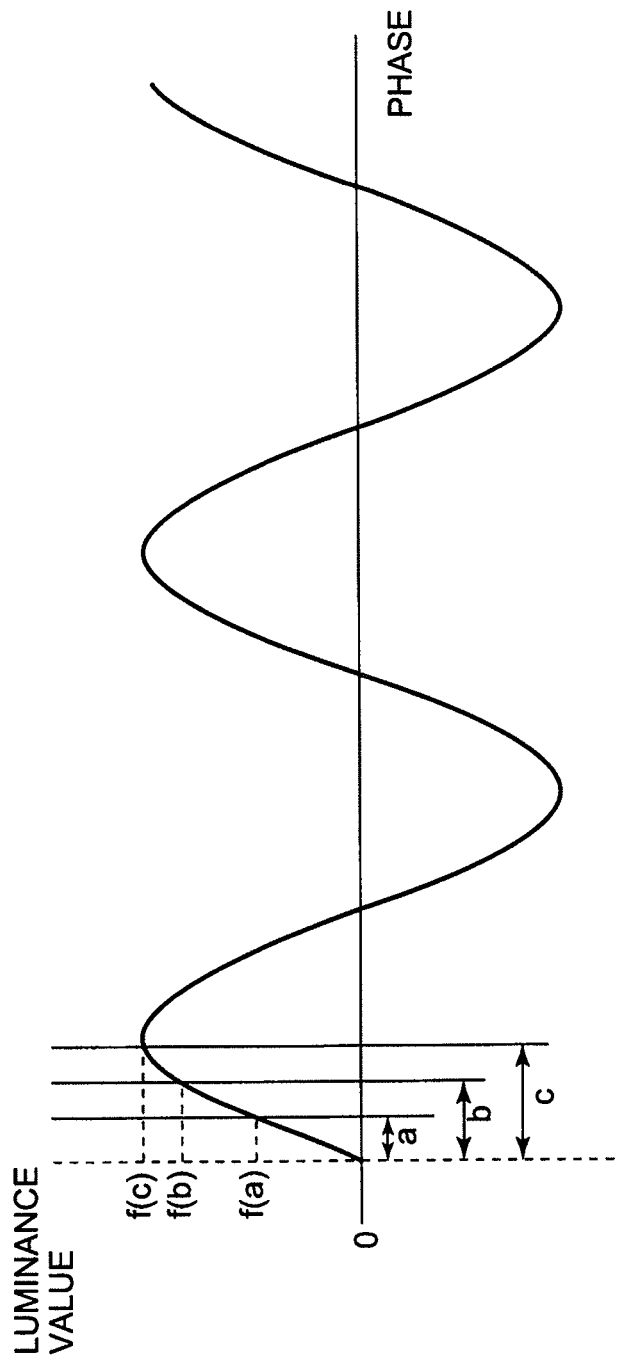
FIG. 2 It depicts an explanatory diagram that shows an example of a function representing a luminance value which will continuously change as phase changes.

FIG. 2 is an example of a function representing the luminance value that will continuously change as the phase changes. Let such a function be expressed as "f". In the function as shown by way of example in FIG. 2, initial phase values such as "a", "b", "c" are each defined according to coordinate. An x-axis that represents the positions of pixels in an image is described as an example below. Each initial phase value is defined according to a particular x-coordinate. For example, an initial phase value corresponding to an x-coordinate is defined as "a", an initial phase value corresponding to another x-coordinate, as "b", an initial phase value corresponding to yet another x-coordinate, as "c", and so on. For example, a luminance value of each pixel at the x-coordinate corresponding to the initial phase value "a" is defined as "f(a)", a luminance value of each pixel at the x-coordinate corresponding to the initial phase value "b", as "f(b)", and a luminance value of each pixel at the x-coordinate corresponding to the initial phase value "c", as "f(c)". Defining each initial phase value according to the particular x-coordinate in this way enables the first (0th) image in a reference pattern image group to be obtained. An image whose luminance continuously changes with changes in x-coordinate can be obtained since each initial phase value is defined according to the particular x-coordinate and since a luminance value corresponding to the defined initial phase value is defined by such sine-wave function "f" as shown by way of example in FIG. 2.

Figure 3:
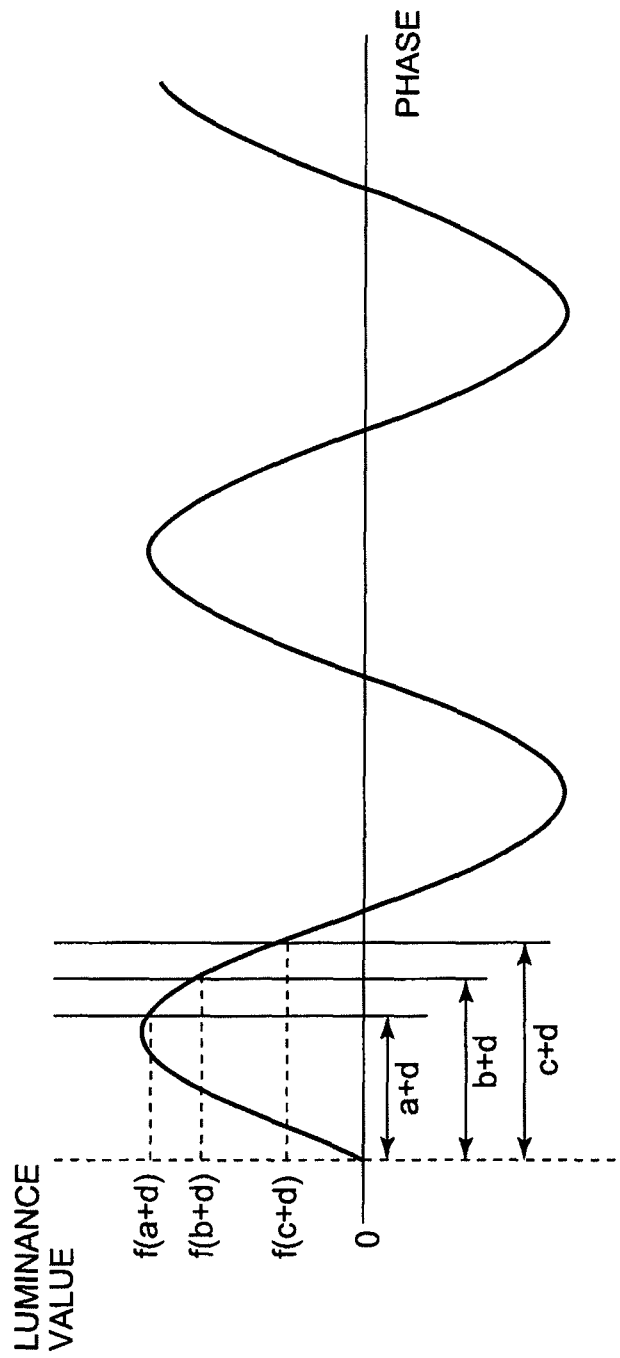
FIG. 3 It depicts an explanatory diagram that shows luminance values obtained when the phase is shifted by an amount "d" from initial phase values shown as an example in FIG. 2.

In addition, an image whose luminance is defined by changing the phase by the same amount from the initial phase value corresponding to the x-coordinate becomes another image in the reference pattern image group. FIG. 3 is an explanatory diagram that shows the luminance values obtained when the phase is shifted through an amount "d" from the initial phase values shown as an example in FIG. 2. For example, let the luminance value at the x-coordinate corresponding to the initial phase value "a" be "f(a+d)", let the luminance value at the x-coordinate corresponding to the initial phase value "b" be "f(b+d)", and let the luminance value at the x-coordinate corresponding to the initial phase value "c" be "f(c+d)". One image can be obtained by defining each luminance value according to the particular x-coordinate similarly, and multiple kinds of similar images can be obtained by changing the value of the phase to be changed from each initial phase value (i.e., the amount "d").

These images belonging to the reference pattern image group will each change in luminance continuously as the coordinate (in the above example, the x-coordinate) will change along one coordinate axis. If each image belonging to a certain reference pattern image group is compared, the entire image will be observed to move along a coordinate axis with increases in the amount "d" by which the phase is to be changed from an initial phase value. For example, if each image is compared in the reference pattern image group which has been generated with initial phase values defined for each x-coordinate, the entire image will be observed to move along the x-coordinate axis. In addition, for example, if each image is compared in the reference pattern image group generated with initial phase values defined for each y-coordinate, the entire image will be observed to move along the y-coordinate axis.

Furthermore, if changes in the luminance of each image in a reference pattern image group are observed focusing attention on individual coordinates present along the above coordinate axes, one will find that brightness changes with changes in the amount "d" by which the phase is to be changed from the initial phase value.

The information-processing apparatus 3 generates reference pattern image groups for two coordinate axes. The following describes an example in which the information-processing apparatus 3 generates a reference pattern image group for the x-coordinate axis and that of the y-coordinate axis. The two coordinate axes referred to here, however, are not limited to the x-axis and the y-axis. The two coordinate axes can be any two axes that are not parallel to one another. Additionally, directions of the two coordinate axes are not limited to horizontal and vertical directions and can be arbitrary.

The projection means 1 projects each image of such reference pattern image groups on the projection screen 7, and the photographing means 2 photographs the images. At this time, a constant relationship in position is maintained between the projection means 1, the photographing means 2, and the projection screen 7. When attention is focused on the pixels of the same position in each photographic image, the luminance of these pixels change for each image, so initial phase values corresponding to the changes in the luminance of each pixel can be calculated from the particular change in the image. The information-processing apparatus 3 calculates, from the changes in the luminance of the pixels between photographic images, the initial phase values corresponding to the changes in the luminance of each pixel. The information-processing apparatus 3 also identifies which coordinates of pixel data in the reference pattern image group projected the pixels in the image which the photographing means 2 has photographed correspond to, and further specifies the correspondence between the pixels in the image to be projected and the pixels in the projection means 1.

The information-processing apparatus 3 creates a reference pattern image group with attention focused on the x-axis direction, controls the projection means 1 to project each image, and controls the photographing means 2 to photograph the image. The information-processing apparatus 3 next identifies to which x-coordinates of pixel data in the reference pattern image group the pixels in the photographic image correspond. In the same manner, the information-processing apparatus 3 creates a reference pattern image group with attention focused on the y-axis direction, controls the projection means 1 to project each image, and controls the photographing means 2 to photograph the image. The information-processing apparatus 3 next identifies to which y-coordinates of pixel data in the reference pattern image group the pixels in the photographic image correspond. Accordingly, the correspondence between the pixels in the image which the photographing means 2 is to photograph from the same direction as that of the viewer 8, and the coordinates (x, y) of the pixels in the image to be projected, is determined and the correspondence between the pixels in the image to be projected and the pixels in the projection means 1 is specified.

Figure 4:
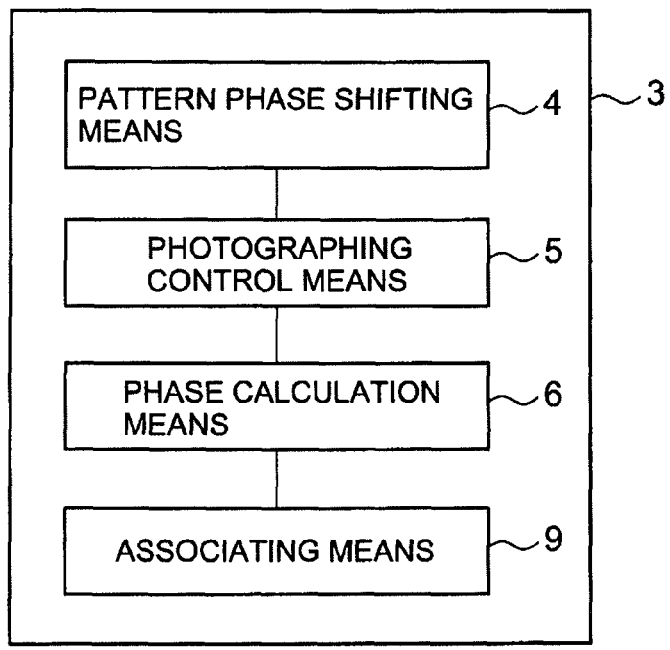
FIG. 4 It depicts a block diagram that shows an example of an information-processing apparatus configuration.

FIG. 4 is a block diagram that shows an example of a configuration of the information-processing apparatus 3. The information-processing apparatus 3 includes pattern phase shifting means 4, photographing control means 5, phase calculation means 6, and associating means 9.

The pattern phase shifting means 4 creates independent reference pattern image groups for x-coordinates and the y-coordinates each. For creating a reference pattern image group for x-coordinates, the pattern phase shifting means 4 calculates initial phase values corresponding to values of each x-coordinate, and generates the first (0th) image of the reference pattern image group by defining the luminance value at each x-coordinate from the initial phase values. Furthermore, the pattern phase shifting means 4 calculates the phase values corresponding to each x-coordinate, by changing the phase by the same amount "d" from the initial phase values corresponding to the x-coordinates, and generates next image of the reference pattern image group by defining the luminance value at each x-coordinate from the phase value. The pattern phase shifting means 4 increases the variation in phase from each initial phase value and similarly generates a further image belonging to the reference pattern image group.

The pattern phase shifting means 4 generates a reference pattern image group for y-coordinates in a manner similar to the above.

The photographing control means 5 controls the projection means 1 (see FIG. 1) to project the individual images belonging to the reference pattern image groups for x-coordinates and y-coordinates, and controls the photographing means 2 to photograph each image projected on the projection screen 7. In the present exemplary embodiment, the photographing control means 5 controls the projection means 1 to project the images, one at a time, that belong to each reference pattern image group, and controls the photographing means 2 to photograph the projected images, one at a time.

On the basis of changes in luminance between the photographic images obtained by photographing each image belonging to the reference pattern image group for x-coordinates, the phase calculation means 6 calculates the initial phase values corresponding to the changes in the luminance between the photographic images. On the basis of changes in luminance between the photographic images obtained by photographing each image belonging to the reference pattern image group for y-coordinates, the phase calculation means 6 likewise calculates the initial phase values corresponding to the changes in the luminance between the photographic images.

The associating means 9 identifies, from the initial phase values that have been calculated from each photographic image in the reference pattern image group of x-coordinates, to which x-coordinates in the reference pattern image group the pixels in the photographic image correspond. Similarly, the associating means 9 identifies, from the initial phase values that have been calculated from each photographic image in the reference pattern image group of y-coordinates, to which y-coordinates in the reference pattern image group the pixels in the photographic image correspond. The associating means 9 further specifies the correspondence between the pixels in the image to be projected and the pixels in the projection means 1.

The pattern phase shifting means 4, the photographing control means 5, the phase calculation means 6, and the associating means 9 are implemented by, for example, a CPU that operates in accordance with a program for specifying pixel position correspondence. The program may be stored in a program storage device (not shown) that, for example, the information-processing apparatus 3 includes, and the CPU may read in the program and operate as the pattern phase shifting means 4, the photographing control means 5, the phase calculation means 6, and the associating means 9, in accordance with the program. In addition, the pattern phase shifting means 4, the photographing control means 5, the phase calculation means 6, and the associating means 9 may each be independent hardware.

Next, operation is described below.

Figure 5:
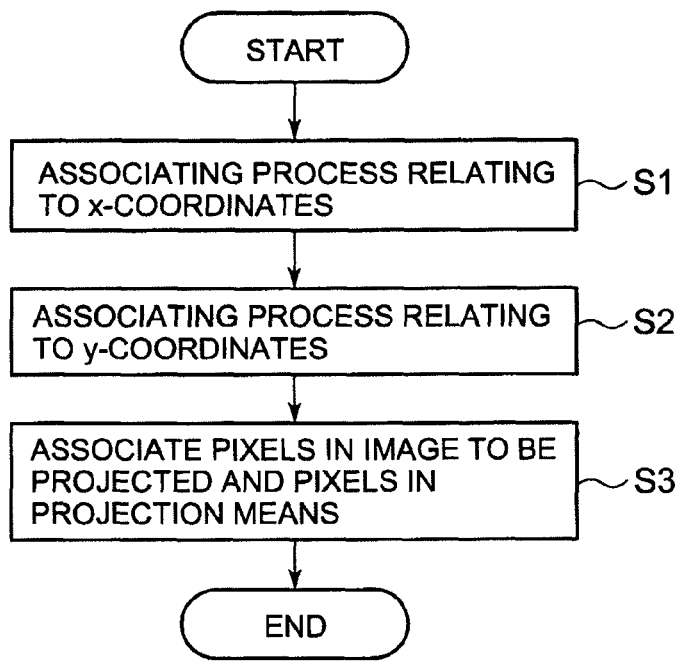
FIG. 5 It depicts a flowchart that shows an example of a process flow in the first exemplary embodiment of the present invention.

FIG. 5 is a flowchart that shows an example of a process flow in the first exemplary embodiment of the present invention. In step S1, the information-processing apparatus 3 defines which pixels in the photographic image obtained by photographing the image projected on the projection screen 7 correspond to which x-coordinates in the image to be projected (reference pattern image group). Next in step S2, the information-processing apparatus 3 defines which pixels in the photographic image obtained by photographing the image projected on the projection screen 7 correspond to which y-coordinates in the image to be projected. Execution of steps S1, S2 determines which coordinates of image data in the image to be projected the pixels in the photographic image are. On the basis of the correspondence determined in steps S1, S2, the information-processing apparatus 3 defines in step S3 the correspondence between positions of the pixels in the image to be projected and those of the pixels in the projection means 1.

The processes of steps S1, S2 are substantially the same except that both differ in whether the elements to be associated with the pixels in the photographic image are x-coordinates or y-coordinates. Details of the process for defining the correspondence between the pixels and coordinates in a photographic image are described below taking, as an example, step S1 for defining the correspondence with respect to x-coordinates. FIG. 6 is a flowchart that shows an example of a flow of the associating process (step S1) relating to x-coordinates.

First in step S11 of step S1, the pattern phase shifting means 4 generates a reference pattern image group. For generating the reference pattern image group for x-coordinates, the pattern phase shifting means 4 calculates initial phase values corresponding to x-coordinates. Each initial phase value can be calculated as a function value of a function which takes coordinates as variables, the function being a function that will continuously change as values of the coordinates are converted. The function for calculating the initial phase values corresponding to coordinates is hereinafter expressed as "$s_0$". The pattern phase shifting means 4 uses, for example, the function represented in expression (1) below, to calculate the initial phase values corresponding to each coordinate.

$$S_0(x) = T/(w-1+2 \cdot m) \cdot (x-m) \quad \text{Expression (1)}$$

In expression (1), "x" denotes a value of an x-coordinate in the reference pattern image group, "w" denotes width of the image which the projection means 1 can project (i.e., the number of pixels), and "T" denotes a period in the function "f" for calculating a luminance value with phase as a variable. The present example assumes that a luminance change pattern by the function "f" is sinusoidal. In the present example, therefore, $T=2\pi$. Additionally, "m" denotes a constant defined allowing for a phase calculation error so that interference does not occur between a pixel of x=0 and a pixel of w−1. The constant is hereinafter referred to as the margin constant. The margin constant is defined as a value of about 1% of the image width "w".

Expression (1) is an example of a function for calculating the initial phase values corresponding to x-coordinates. The initial phase values may be calculated using a function other than that denoted by expression (1).

The pattern phase shifting means 4 uses the function "f" to calculate, for each x-coordinate, the luminance value corresponding to the initial phase value "$s_0(x)$" derived from the x-coordinate. That is to say, the luminance values corresponding to each x-coordinate are defined using the function of expression (2) shown below.

$$I(x) = f(s_0(x)) \quad \text{Expression (2)}$$

This provides an image having the luminance values defined for each x-coordinate. This image is the first (0th) image in the reference pattern image group. In expression (2), "I(x)" in a left side thereof means the luminance of the pixel corresponding to the value of the x-coordinate. As already described herein, the function "f" is a function that continuously changes as the phase changes, and this function denotes sinusoidal changes in luminance in the present example.

The pattern phase shifting means 4 further calculates a phase having an added common phase value, for the initial phase values derived for each x-coordinate. More specifically, the amount of phase to be added is taken as "d(i)", and the phase appropriate for the value of the x-coordinate is calculated for each x-coordinate. After this, the pattern phase shifting means 4 assigns the resultingly obtained phase to the function "f" for calculating the luminance values, and calculates the luminance values of each x-coordinate. The image having the luminance values defined for each x-coordinate is obtained as a result. The pattern phase shifting means 4 likewise generates images by changing the phase value to be added. If the luminance obtained by assigning to the function "f" the phase which has been derived using the phase value "d(i)" to be added to the initial phase value is taken as "$I_i(x)$", "$I_i(x)$" can be represented as follows using expression (3).

$$I_i(x)=f(s_0(x)+d(i))  \quad \text{Expression (3)}$$

A value of "d(i)" can be predefined as in expression (4) shown below, for example.

$$d(i)=(T/N_s)\times i \quad \text{Expression (4)}$$

where "$N_s$" denotes the number of images to be generated as the reference pattern image group, and "i" takes any one of values 1, 2, etc. up to $N_s-1$. For example, if $N_s=4$, this gives "d(i)=T/4, T/2, 3T/4". In the present example, since T=2π, it follows that "d(i)=π/2, π, 3π/T". This means that in addition to the first image whose luminance has been calculated using "$f(s_0(x))$", the pattern phase shifting means 4 generates an image whose luminance has been calculated using "$f(s_0(x)+π/2)$", an image whose luminance has been calculated using "$f(s_0(x)+π)$", and an image whose luminance has been calculated using "$f(s_0(x)+3π/2)$". A reference pattern image group that contains four images, or the 0th to third images, is obtained as a result. This order is denoted by "i" in "d(i)".

Expression (4) is an example of an expression for calculating the amount of phase to be added to initial phase values. Other methods may instead be used to define the amount of phase to be added. In addition, while the above example relates to generating a reference pattern image group that contains four images, the number of images whose data is to be calculated is not limited to 4 and may be 5 or more. This number may otherwise be 3. When a function that represents sinusoidal changes in luminance is to be used as the function "f", it suffices just to generate at least three images.

After the generation of the reference pattern image group, the photographing control means 5 controls the projection means 1 to project the images of the reference pattern image group, one by one, on the projection screen 7. In step S12, the photographing control means 5 controls the photographing means 2 to independently photograph each image projected on the projection screen 7, and receives each photographic image from the photographing means 2.

After step S12, on the basis of the changes in the luminance between the photographic images, the phase calculation means 6 calculates corresponding initial phase values on a pixel-by-pixel basis in step S13. Even if the projected image suffers distortion due to the fact that the projection screen 7 is of an arbitrary shape, changing the image to be projected will not change the position at which the pixel of certain coordinates is to be projected. In addition, since luminance is varied for each x-coordinate, the luminance of the pixel at the same position in each photographic image will change similarly to the luminance of the image at the same position in each image belonging to the reference pattern image group. FIG. 7 is an explanatory diagram that shows an example of changes in luminance of the same pixel in a plurality of photographic images. In step S12, the phase calculation means 6 calculates the initial phase values corresponding to such changes in luminance as shown by way of example in FIG. 7.

The following describes the way the phase calculation means 6 calculates the initial phase values corresponding to the changes in the luminance of the pixels in the photographic images. Luminance "$I_j$" of a pixel in the jth photographic image, wherein the pixel corresponds to a common position in each photographic image, is represented using expression (5) shown below.

$$I_j = A \cdot f(\phi+d(j))+B \quad \text{Expression (5)}$$

where "d(j)" represents the amount of phase added to the initial phase value in the jth photographic image. The amount of phase added for the 0th photographic image (i.e., the first photographic image in the reference pattern image group) is "d(0)=0". For "j=1" onward, a value equal to that of "d(i)" which was used during the generation of the reference pattern image group is defined as "d(j)". Symbol A in expression (5) denotes amplitude that corresponds to the luminance value varying for each photographic image. Symbol B in expression (5) denotes luminance of a background.

The values of "$I_j$" and "d(j)" in each photographic image are known for the pixel corresponding to the same position. The phase calculation means 6 assigns "$I_j$" and "d(j)" to expression (5) for each photographic image and calculates φ, an unknown value. Three unknown values, namely A, B, and φ, exist, and φ can be calculated by solving simultaneous equations created by the assignment of "$I_j$" and "d(j)" to expression (5) for each photographic image.

If the number of equations obtained by the assignment of "$I_j$" and "d(j)" to expression (5) for each photographic image is greater than a number necessary to derive solutions of the simultaneous equations, the method of least squares may instead be used to calculate φ from the equations. For example, if an N number of images are photographed and the following N number of equations are obtained, values of φ may be calculated from the N number of equations by using the method of least squares.

$$\begin{aligned} I_0 &= A \cdot f(\varphi + d(0)) + B \\ I_1 &= A \cdot f(\varphi + d(1)) + B \\ I_2 &= A \cdot f(\varphi + d(2)) + B \\ &\vdots \\ I_N &= A \cdot f(\varphi + d(N)) + B \end{aligned} \quad \text{[Formula 1]}$$

The phase calculation means 6 executes this process for each pixel in the photographic image.

Further alternatively, if, as described by way of example in step S11, the function "f" for calculating the luminance value is a function that represents sinusoidal changes in luminance and has a period of 2π, and "d(i)" is already calculated using expression (4), then the phase calculation means 6 may calculate the initial phase value φ in the pixel of interest, by conducting a calculation of expression (6) shown below.

$$\phi = \pi - \arctan((I_c(0)-I_c(2))/(I_c(3)-I_c(1)))$$ Expression (6)

In this case, A and B can be calculated using expressions (7) and (8) shown below, respectively.

$$A = 0.5 \times \text{square root}[((I_c(0)-I_c(2))^2+(I_c(1)-I_c(3))^2)]$$ Expression (7)

$$B = (I_c(0)+I_c(1)+I_c(2)+I_c(3))/2.0$$ Expression (8)

where $I_c(0)$, $I_c(1)$, $I_c(2)$, $I_c(3)$ are values of pixels common in position, $I_c(0)$ being the value of a pixel in the 0th photographic image, $I_c(1)$ being the value of a pixel in the first photographic image, $I_c(2)$ being the value of a pixel in the second photographic image, and $I_c(3)$ being the value of a pixel in the third photographic image.

The phase calculation means 6 uses expression (6) to calculate the initial phase values relating to each pixel in the photographic image.

Only the section of the photographic image that corresponds to the projected image is defined (hereinafter, this section is referred to as the target image region). The system configuration may be such that this region is specified by an operator. For example, the information-processing apparatus 3 may be configured to include a display device that displays the photographic image, and a pointing device that accepts the specification of the target image region in the photographic image. Alternatively, the phase calculation means 6 may determine that a rectangular region including a region whose luminance is in excess of a predetermined level is the target image region.

After step S13, the associating means 9 executes step S14 to define, from the initial phase values that were calculated for the pixels in the photographic image, which x-coordinates of the pixels in the image to be projected the pixels in the photographic image correspond to.

Even if image distortion occurs on the projection screen 7, the image to be projected and the corresponding pixels of the photographic image undergo similar changes in luminance. Between the corresponding pixels, therefore, the initial phase values corresponding to the changes in the luminance are equal, so in step S14, the associating means 9 conducts x-coordinate inverse calculations from the initial phase values calculated in step S13. The corresponding x-coordinates (i.e., the x-coordinates in the image which the projection means 1 projects) are thus calculated for the pixels in the photographic images. For example, when the pattern phase shifting means 4 calculates the initial phase values by conducting the calculation of expression (1), the associating means 9 assigns each initial phase value calculated in step S13, as "$s_0(x)$" to expression (1) and calculates the x-coordinates by inverse operations. By conducting this process for each pixel, the associating means 9 defines to which x-coordinates of the pixels in the image to be projected the pixels in the photographic image correspond.

After calculating in step S14 the x-coordinates corresponding to the pixels in the photographic image, the associating means 9 associates the x-, y-coordinates of the photographic image with the corresponding x-coordinates in a table (hereinafter, referred to as the intermediate table) representing the correspondence between the pixels in the photographic image and the pixels in the image to be projected. For example, suppose that an x-coordinate that was calculated by an inverse operation from the initial phase value of a pixel of (50, 150) in the photographic image is "100". In this example, as shown in FIG. 8(a), the associating means 9 associates the pixel of (50, 150) in the photographic image and the x-coordinate of "100" of the corresponding pixel. At this time, the y-coordinate of the pixel corresponding to the pixel in the photographic image is undefined since this y-coordinate is not specified. While the pixel of (50, 150) in the photographic image is shown by way of example in FIG. 8(a), other pixels are also processed similarly.

Upon completion of steps S11 to S14, step S1 (see FIG. 5) is completed. A process for defining to which y-coordinates the pixels in the photographic image correspond (i.e., step S2) can be conducted by executing steps S11 to S14 in a similar manner.

In step S11, however, the pattern phase shifting means 4 generates a reference pattern image group relating to y-coordinates. At this time, the pattern phase shifting means 4 calculates initial phase values corresponding to y-coordinates. For example, the pattern phase shifting means 4 uses a function of expression (9) below to calculate the initial phase values corresponding to each coordinate.

$$s_0(y) = T/(h-1+2 \cdot m) \cdot (y-m')$$ Expression (9)

In expression (9), "y" denotes a value of a y-coordinate in a pixel of the reference pattern image group. Also, "h" denotes height of (the number of pixels in) an image which the projection means 1 can project, "T" denotes the same as that of expression (1), and "m'" denotes a margin constant, as with "m" in expression (1). The margin constant is defined as a value of about 1% of the image height "h". Expression (9) shows an example, and a function other than that of expression (9) may be used to define each initial phase value.

After calculating the initial phase values corresponding to y-coordinates, the pattern phase shifting means 4 generates the first (0th) image of the reference pattern image group by defining luminance values that correspond to the initial phase values. In addition, the pattern phase shifting means 4 generates other images of the reference pattern image group by defining, for each pixel, luminance values corresponding to phase values obtained by adding a phase "d(i)" to the initial phase values.

This process is substantially the same as that of above-described step S11, except that the initial phase values corresponding to y-coordinates are defined.

After step S11, steps S12 and S13 are executed. The latter two steps are the same as steps S12 and S13 described above.

In step S14, the associating means 9 defines, from the initial phase values calculated in step S13, to which y-coordinates in the image to be projected the pixels in the photographic image correspond. At this time, an inverse operation of the calculation for deriving initial phase values from y-coordinates, as in expression (9), is instituted to calculate the y-coordinates from the initial phase values. After calculating the y-coordinates corresponding to the pixels in the photographic image, the associating means 9 associates the y-coordinates with the pixels in the photographic image and adds the y-coordinates to the intermediate table. For example, suppose that a y-coordinate that was calculated by an inverse operation from the initial phase value of the pixel of (50, 150) in the photographic image is "50". In this example, as shown in FIG. 8(b), the associating means 9 conducts association with the pixel of (50, 150) in the photographic image and adds the y-coordinate of "50" to the intermediate table. In this way, in the state of FIG. 8(a) with an undefined y-coordinate, a y-coordinate is added (see FIG. 8(b)). The associating means 9 conducts this process for each pixel, thus completing the intermediate table. This intermediate table represents the correspondence between the pixels in the photographic image and those of the image to be projected.

Figures 8, 9:
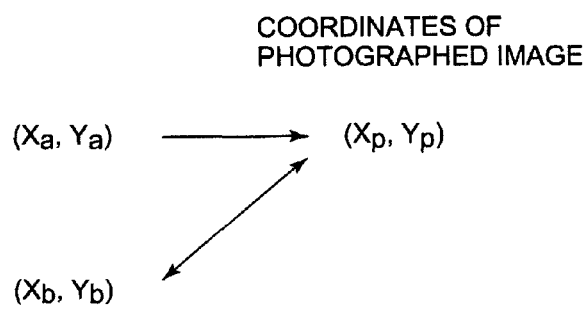
FIG. 8 It depicts an explanatory diagram that shows an example of an intermediate table in which pixels in an image to be projected and pixels in a photographic image are associated.
FIG. 9 It depicts an explanatory diagram that shows an example of associating pixels in step S3.

After step S2 (see FIG. 5), the associating means 9 associates in step S3 the coordinates of a pixel in the image to be projected, that is, a pixel to be projected on a pixel in the photographic image, and coordinates corresponding to the pixel in the photographic image. FIG. 9 is an explanatory diagram that shows an example of associating pixels in step S3. This diagram assumes that for an undistorted image to be viewed, the pixel of the coordinates $(X_a, Y_a)$ in the image to be projected needs to be projected so as to be the pixel of the coordinates $(X_p, Y_p)$ in the photographic image. The pixel in the photographic image that will be viewed without distortion is hereinafter referred to as the target pixel. It is also assumed that in the intermediate table, coordinates $(X_b, Y_b)$ are associated with the pixel of $(X_p, Y_p)$ in the photographic image. The associating means 9 searches for the pixel of $(X_b, Y_b)$ corresponding to the target pixel of $(X_p, Y_p)$, from the intermediate table, and associates the pixel in the image to be projected, that is, the pixel of $(X_a, Y_a)$ to be projected on the target pixel, and the coordinates $(X_b, Y_b)$ associated with the target pixel in the intermediate table. This associating process is conducted for each pixel in the image to be projected, that is, for each pixel that is to be projected on each target pixel. If a luminance value of the pixel of the coordinates $(X_b, Y_b)$ in the projection means 1 is set to be equal to a luminance value of the pixel of the coordinates $(X_a, Y_a)$ in the image to be projected, and luminance values of other pixels in the projection means 1 are also set similarly, the pixel of $(X_a, Y_a)$ in the image to be projected is changed to a position of $(X_b, Y_b)$, under which state, the pixel of $(X_a, Y_a)$ is then projected at a position of the desired target pixel of $(X_p, Y_p)$ on the projection screen 7. In this fashion, the associating means 9 associates the pixel (in the image to be projected) that is to be projected on a pixel of the photographic image, and the coordinates of the pixel in the photographic image, and hence associates the position of the pixel in the image to be projected and that of the pixel in the projection means 1.

After thus associating the position of the pixel in the image to be projected and that of the pixel in the projection means 1, the associating means 9 stores or outputs the correspondence as a table (hereinafter, referred to as the image correspondence table).

According to the present invention, the correspondence between the position of a pixel in the image to be projected and that of a pixel in the projection means 1 is specified by associating the pixel (in the image to be projected) that is to be projected on a target position, and the coordinates associated with the particular position in the intermediate table.

This correspondence is maintained unless the positional relationship between the projection means 1, the photographing means 2, and the projection screen is disturbed or changed. Therefore, when an image to be presented to the viewer 8 (see FIG. 1) is projected on the projection screen 7 without a change of the positional relationship between the projection means 1, the photographing means 2, and the projection screen, the image can be presented to the viewer 8 with minimal distortion, if provided with appropriate correction based on the correspondence.

In addition, the system according to the present invention defines an initial phase value for each pixel, generates, as reference pattern image groups, an image whose luminance value has been derived from the initial phase value, and an image whose luminance value has been obtained by shifting the phase from the initial phase value and then calculating a luminance value from this phase value, and projects the images. The system further photographs the images. At this time, between the photographic images obtained by photographing, the luminance of each pixel changes similarly to changes in luminance between the images of the reference pattern image groups. Additionally, the corresponding pixels are common in initial phase value. This property is established independently of the shape of the projection screen 7.

In the present invention, this characteristic is utilized to define the correspondence between a pixel in the photographic image and a pixel in the image to be projected. The correspondence between the position of a pixel in the image to be projected and that of a pixel in the projection means, therefore, is specified, even if the projection screen 7 has an arbitrary shape.

The correspondence can also be derived if photographic images are obtained by generating reference pattern image groups, projecting each reference pattern image group on the projection screen, and photographing the reference pattern image group. The correspondence can therefore be derived at low costs since there is no need to use a three-dimensional shape-measuring device for measuring the shape of the projection screen.

An example in which a function that represents sinusoidal changes in luminance value is used as the function "f" for calculating the luminance value has been described in the above exemplary embodiments. The function "f", however, can be any continuous function that continuously changes with changes in phase. The function "f" can therefore be, for example, a function that represents triangular-wave-shaped changes in luminance value, not a sine function or other functions that gently change in function value.

The use of a continuous function as the function "f" comes from the following reasons. If the function "f" is not a continuous function and has discontinuous sections that resemble sawtooth waves, the luminance values of adjacent pixels abruptly change. This poses a problem in that if the photographing means 2 lacks resolution, the sections where the luminance values are abruptly changing may be blurredly photographed and an intermediate value of the luminance values that abruptly change may be recognized as luminance. If this is the case, the pixels are likely to be associated with unintended pixels.

In the present invention, however, erroneous associating in the above case can be prevented since a continuous function that continuously changes with changes in phase is used as the function "f" for calculating the luminance value. This means that correction accuracy can be improved when the image to be projected is corrected in accordance with the correspondence of its pixels.

Additionally, in the present invention, a minimum number of images required for the phase calculation means 6 to calculate initial phase values need only to be generated as a reference pattern image group and there is no need to generate a number of images as the reference pattern image group. Rapid processing can therefore be implemented. In one example, if a function that represents sinusoidal changes in luminance value is used as the function "f" for calculating the luminance value, a reference pattern image group containing at least three images needs only to be generated for one coordinate axis. In this example, the number of images to be generated as the reference pattern image group can be minimized and thus, rapid processing achieved.

Second Exemplary Embodiment

As with that of the first exemplary embodiment, a pixel position correspondence specifying system according to a second exemplary embodiment of the present invention includes the projection means 1, photographing means 2, and information-processing apparatus 3 (see FIG. 1). The second exemplary embodiment is described below referring to FIG. 1. The pixel position correspondence specifying system according to the second exemplary embodiment, as with that of the first exemplary embodiment, creates the pixel correspondence table that represents the correspondence between the positions of pixels in an image to be projected and those of pixels in the projection means 1. In addition to this, the information-processing apparatus 3 in the second exemplary embodiment uses the pixel correspondence table to correct the image to be projected on the projection screen 7 for presentation to the viewer 8, and controls the projection means 1 to project the corrected image.

Figure 10:
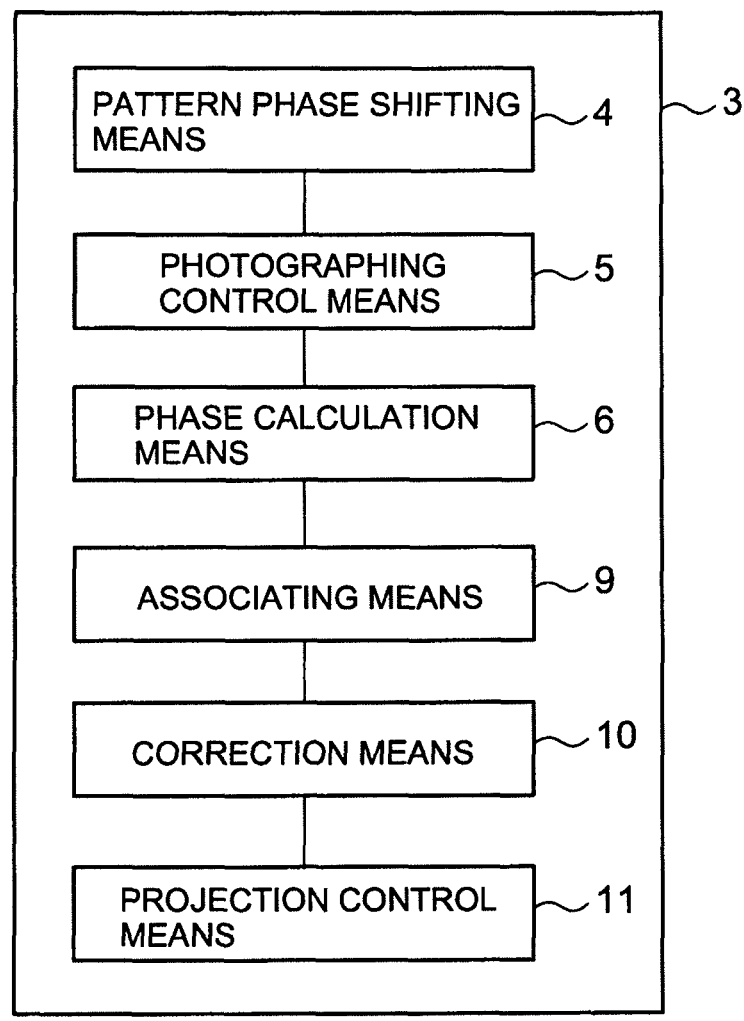
FIG. 10 It depicts a block diagram that shows an example of an information-processing apparatus configuration in a second exemplary embodiment.

FIG. 10 is a block diagram that shows an example of a configuration of the information-processing apparatus 3 in the second exemplary embodiment. Substantially the same constituent elements as those of the information-processing apparatus 3 in the first exemplary embodiment are assigned the same reference numbers as used in FIG. 4, and detailed description of these elements is omitted. The information-processing apparatus 3 in the second exemplary embodiment includes the pattern phase shifting means 4, the photographing control means 5, the phase calculation means 6, the associating means 9, correction means 10, and projection control means 11. The operation of the pattern phase shifting means 4, photographing control means 5, phase calculation means 6, and associating means 9, is substantially the same as in the first exemplary embodiment.

The correction means 10 uses the pixel correspondence table to correct the image to be projected on the projection screen 7 for presentation to the viewer 8. The projection control means 11 controls the projection means 1 to project the corrected image.

Next, operation of the present exemplary embodiment is described below.

First, the information-processing apparatus 3 generates the pixel correspondence table that represents the correspondence between the positions of pixels in an image to be projected and those of pixels in the projection means 1. This operation is substantially the same as in the first exemplary embodiment, and further description is therefore omitted.

After the generation of the pixel correspondence table, the correction means 10 corrects the image to be projected for presentation to the viewer 8 (see FIG. 1). The correction means 10 generates, as the corrected image, an image for which the luminance value of the pixels in the projection means 1 is set to equal the luminance value of the corresponding pixels in the image to be projected. As shown by way of example in FIG. 9, if the coordinates $(X_a, Y_a)$ and $(X_b, Y_b)$ are associated, the image for which the luminance value of the pixel of $(X_a, Y_a)$ in the image to be projected is set to equal the luminance value of the pixel of $(X_b, Y_b)$ and the luminance value of other pixels is also similarly set, is generated as the corrected image. As a result, the pixel of $(X_a, Y_a)$ in the image to be projected is moved to the position of $(X_b, Y_b)$ and then the image is projected on a desired position of the projection screen 7. This eliminates distortion of the image as projected on the projection screen 7.

The projection control means 11 controls the projection means 1 to project the image, corrected by the correction means 10, on the projection screen 7. The image projection assumes that the relationship in position between the projection means 1 and the projection screen remains undisturbed after the creation of the pixel correspondence table. It is also assumed that the viewer 8 views the projection screen 7 from the same direction as that of the photographing means 2 during the creation of the pixel correspondence table.

If the image is projected in an uncorrected condition, the pixels in the image will be projected on a position different from the desired position and the image will be distorted. In the present exemplary embodiment, however, the pixel correspondence table generated similarly to the first exemplary embodiment is used to correct the image to be projected and then project the corrected image. This allows desired luminance values to be projected on various positions, and the image to be projected on the projection screen 7 of an arbitrary shape without making the viewer aware of the distortion.

According to the present exemplary embodiment, since the pixel correspondence table is used to correct the image and project the corrected image, an image suppressed in distortion due to the shape of the projection screen is presented to the viewer.

In addition, as with the first exemplary embodiment, even if the projection screen 7 is of an arbitrary shape, the present (second) exemplary embodiment specifies the correspondence between the pixels in the image to be projected and the pixels in the projection means 1, so that an image minimized in distortion, regardless of the shape of the projection screen, is presented to the viewer.

Furthermore, as with the first exemplary embodiment, the present exemplary embodiment creates the intermediate table at a low cost, at high speed, and with high accuracy.

Moreover, the information-processing apparatus 3 may be an image correction system that receives a pixel correspondence table from the outside, instead of generating the pixel correspondence table, and uses the received pixel correspondence table to correct the image to be projected. The image correction system in this case may not include the projection means 1 and the photographing means 2. In addition, the information-processing apparatus 3 may need only to include the correction means 10. For example, a pixel position correspondence specifying system equivalent to that of the first exemplary embodiment may create a pixel correspondence table and input the pixel correspondence table to the image correction system. Furthermore, the image correction system may be configured to not only correct the image to be projected but also project the corrected image on the projection screen. In this case, the image correction system may need only to include the projection means used to create the pixel correspondence table, and the projection control means that controls the projection means to project the corrected image.

In the present invention, the phase of the reference pattern image groups whose luminance continuously changes is utilized to define the pixel correspondence table that represents the correspondence between the positions of pixels in the image to be projected and those of pixels in the projection means 1. The correspondence can therefore be obtained for each pixel (i.e., at high density), which in turn makes it possible to obtain highly accurate association that represents the corresponding pixel in a floating decimal-point format, for example. In the third exemplary embodiment described below, in particular before initial phase values are calculated, resolution of a region in which pixel positions are to be associated in the photographic image (i.e., resolution of a region equivalent to a region in which the intended image is to be projected) is converted to be the same as resolution of the image to be projected, and then initial phase values are calculated.

Third Exemplary Embodiment

As with the first exemplary embodiment and the second exemplary embodiment, a third exemplary embodiment of the present invention includes the projection means 1, the photographing means 2, and the information-processing apparatus 3 (see FIG. 1). If resolution differs between the photographic image and the image to be projected for presentation to the viewer, a pixel position correspondence specifying system according to the third exemplary embodiment matches the resolution of the photographic image to that of the image to be projected for presentation to the viewer by enlarging or reducing the photographic image. After resolution conversion (i.e., image enlarging or reduction), the system calculates initial phase values for the photographic image (step S13, see FIG. 6), associates the pixels in the resolution-converted photographic image and the coordinates in the reference pattern image group (step S14, see FIG. 6), and then generates the pixel correspondence table. After this process, even if the resolution of the photographic image and that of the image to be projected do not match, the system generates a pixel correspondence table appropriate for desired resolution.

In addition, a highly accurate pixel correspondence table can be obtained particularly for the reduction of the photographic image. To cite an example, if the resolution of the photographic image is higher than that of the image to be projected, reducing the photographic image before calculating any initial phase value enables the system to even generate an image that exceeds performance of the photographing means 2 (camera) in terms of noise and contrast. Using the thus-generated image to calculate initial phase values and create a pixel correspondence table in a manner similar to that of the first exemplary embodiment provides a highly accurate pixel correspondence table.

Figure 11:
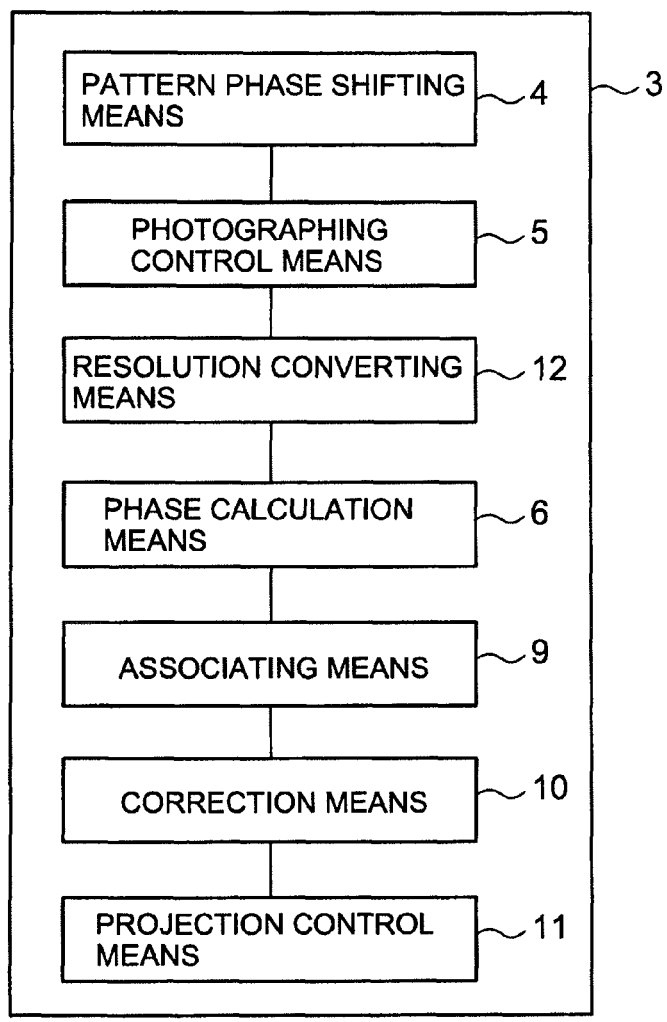
FIG. 11 It depicts a block diagram that shows an example of an information-processing apparatus configuration in a third exemplary embodiment.

FIG. 11 is a block diagram that shows an example of a configuration of the information-processing apparatus in the third exemplary embodiment. Substantially the same constituent elements as those of the information-processing apparatuses 3 in the first exemplary embodiment and the second exemplary embodiment are assigned the same reference numbers as used in FIGS. 4 and 10, and detailed description of these elements is omitted. The information-processing apparatus 3 in the third exemplary embodiment includes the pattern phase shifting means 4, the photographing control means 5, the phase calculation means 6, the associating means 9, the correction means 10, the projection control means 11, and resolution converting means 12.

The resolution converting means 12 enlarges or reduces the target image region in the photographic image so that resolution of the target image region in the photographic image will be the desired resolution of the image to be presented to the viewer. The resolution converting means 12 extracts the target image region from the photographic image and enlarges or reduces the extracted image. Of the entire photographic image on the projection screen, only a section equivalent to a region at which the operator desires to project the photographic image may be specified as the target image region by the operator, for example.

The pattern phase shifting means 4, the photographing control means 5, the phase calculation means 6, the associating means 9, the correction means 10, the projection control means 11, and the resolution converting means 12 are implemented by, for example, a CPU that operates in accordance with a program for specifying pixel position correspondence. The program may be stored in a program storage device (not shown) that the information-processing apparatus 3, for example, includes, and the CPU may read in the program and operate as the pattern phase shifting means 4, the photographing control means 5, the phase calculation means 6, the associating means 9, the correction means 10, the projection control means 11, and the resolution converting means 12 in accordance with the program. In addition, the constituent elements of the information-processing apparatus 3 may each be independent hardware.

Next, operation of the present exemplary embodiment is described below.

First, the information-processing apparatus 3 conducts the associating process relating to x-coordinates (i.e., in step S1 of FIG. 5), and the associating process relating to y-coordinates (i.e., in step S2 of FIG. 5). The apparatus 3 also executes reference-pattern image group generating process and photographing process in steps S1 and S2. The reference-pattern image group generating process and photographing process are substantially the same as in steps S11 and S12 of the first exemplary embodiment, and further description is therefore omitted.

After executing the reference-pattern image group generating process and the photographing process, the resolution converting means 12 enlarges or reduces the target image region in a photographic image so that resolution of this target image region will be desired resolution of the image presented to the viewer. The image that has been enlarged or reduced for resolution conversion can be called a resolution-converted image.

For enlarging, the resolution converting means 12 defines the luminance value at a coordinate point existing after resolution conversion, on the basis of the luminance value at the corresponding coordinate point existing before the resolution conversion. Enlarging increases the number of pixels. Of all pixels of the enlarged image, therefore, only those wanting the corresponding coordinate points existing before the resolution conversion are subjected to the definition of a luminance value from a predefined luminance value. Interpolation such as linear interpolation or bilinear interpolation is employed to define the luminance value to be obtained.

Figure 12:
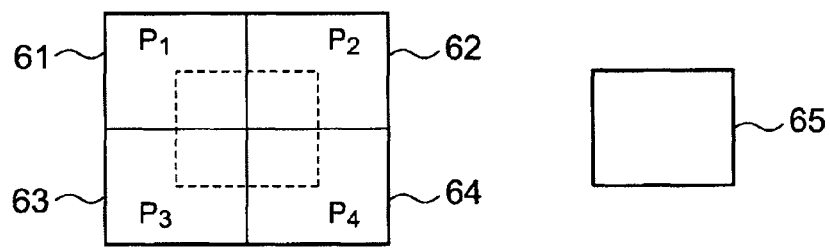
FIG. 12 It depicts an explanatory diagram that shows an example of determining luminance of pixels existing after reduction conversion.

For reduction, the resolution converting means 12 defines the luminance value at a coordinate point existing after resolution conversion, on the basis of the luminance value at the corresponding coordinate point existing before the resolution conversion. Reduction makes one certain pixel within the resolution-converted image correspond to a plurality of pixels in the unconverted image. The resolution converting means 12 weights the luminance values of multiple unconverted pixels made to correspond to a converted pixel, with an area equivalent to that of the converted pixel, and then calculates a linear sum to define the luminance value of the converted pixel. The converted pixel is a pixel in the converted image, and the unconverted pixels are pixels in the unconverted image. FIG. 12 is an explanatory diagram that shows an example of determining luminance of the pixels existing after reduction conversion. This diagram assumes that a pixel 65 in the reduced image corresponds to four pixels, 61 to 64, in the unreduced image. It is also assumed that the luminance values of the pixels 61 to 64 are $P_1$ to $P_4$, respectively. It is further assumed that the pixel 61 corresponds to not only the converted pixel 65 but also other adjoining pixels (not shown) around the pixel 65, and that an area equivalent to that of the converted pixel 65 is ¼ in the pixel 61. The same also applies to the other pixels, 62, 63, 64, in the unconverted image. In the example of FIG. 12, therefore, upon weighting the luminance values of the pixels 61 to 64 at a rate of respective areas and calculating a linear sum thereof, one would obtain $P_1 \times (¼) + P_2 \times (¼) + P_3 \times (¼) + P_4 \times (¼) = (P_1+P_2+P_3+P_4)/4$. The resolution converting means 12 conducts this calculation to define the luminance value of the converted pixel 65 as $(P_1+P_2+P_3+P_4)/4$. The resolution converting means 12 likewise determines luminance values for each pixel in the converted image.

The resolution converting means 12 calculates individual luminance values in this way and generates an enlarged or reduced image. In addition, the resolution converting means 12 enlarges or reduces each photographic image similarly.

After each photographic image has been converted in resolution (i.e., enlarged or reduced), the phase calculation means 6 calculates, for each pixel, initial phase values based on any changes in luminance between these photographic images (i.e., resolution-converted images). This process is substantially the same as in step S13 of the first exemplary embodiment. After this, the associating means 9 associates the coordinates of the pixel in the resolution-converted image and those of the corresponding pixel in the image to be projected. This process is substantially the same as in step S14 of the first exemplary embodiment.

During the associating process relating to x-coordinates (i.e., in step S1 of FIG. 5), the information-processing apparatus 3 executes the reference-pattern image group generating process and the photographing process before, as described above, converting the resolution of the photographic image and then using the resolution-converted image to calculate initial phase values and associate a coordinate of a pixel in the resolution-converted image and an x-coordinate of the corresponding pixel in the image to be photographed. Similarly, during the associating process relating to y-coordinates (i.e., in step S2 of FIG. 5), the information-processing apparatus 3 executes the reference-pattern image group generating process and the photographing process before, as described above, converting the resolution of the photographic image and then using the resolution-converted image to calculate initial phase values and associate a coordinate of a pixel in the resolution-converted image and a y-coordinate of the corresponding pixel in the image to be photographed. The associating means 9 uses these associating results to generate a pixel correspondence table (step S3 shown in FIG. 5).

The correction means 10 uses the pixel correspondence table to correct the image to be projected on the projection screen 7 for presentation to the viewer 8. The operation of the correction means 10 is substantially the same as in the second exemplary embodiment. Additionally, the projection control means 11 controls the projection means 1 to project the image corrected by the correction means 10, on the projection screen 7. The image projection assumes that the relationship in position between the projection means 1 and the projection screen 7 remains undisturbed after the creation of the pixel correspondence table. It is also assumed that the viewer 8 views the projection screen 7 from the same direction as that of the photographing means 2 during the creation of the pixel correspondence table. The two assumed items are substantially the same as in the second exemplary embodiment.

According to the present exemplary embodiment, even if resolution does not match between the photographic image and the image to be projected for presentation to the viewer, the pixel correspondence table appropriate for desired resolution of the image to be projected is generated and the intended image is projected with the desired resolution. In addition, an image minimized in distortion, regardless of the shape of the projection screen, is presented to the viewer.

Furthermore, a highly accurate pixel correspondence table can be obtained when the resolution converting means 12 reduces the photographic image. Determination accuracy of the correspondence (pixel correspondence table) that uses initial phase values depends upon measuring accuracy of the initial phase values, and the measuring accuracy of the initial phase values depends primarily upon a rate of a noise level in the photographic image to contrast of a photographed pattern. Higher contrast of the photographed pattern or smaller magnitude of the noise correspondingly improves the measuring accuracy of the initial phase values. Use of a higher-resolution camera allows the resolution converting means 12 to convert a photographic image into an image of a higher contrast-versus-noise ratio by reducing the photographic image of the reference pattern image group. This is because, since the luminance values of multiple pixels are added during the reduction, random noise levels between the pixels are lowered by mutual counteraction and the contrast is enhanced by the addition. Using such a converted image to calculate the initial phase values and generate the pixel correspondence table improves the accuracy of the pixel correspondence table.

Next, modifications on each exemplary embodiment described above are described below.

In each above exemplary embodiments, the pattern phase shifting means 4 may generate multiple kinds of reference pattern image groups for each of the x- and y-coordinate axes. The following description applies when the pattern phase shifting means 4 generates two kinds of reference pattern image groups for each coordinate axis.

In one modification, the pattern phase shifting means 4 generates a first reference pattern image group and a second reference pattern image group. A period at which luminance changes in a direction of the coordinate axis in the second reference pattern image group is "1/a" times as great as a period at which luminance changes in a direction of the coordinate axis in the first reference pattern image group. In other words, the second reference pattern image group is an image group obtained by compressing the first reference pattern image group to "1/a" times in the direction of the coordinate axis. The images belonging to the second reference pattern image group are of the same size as that of the images belonging to the first reference pattern image group, and the images belonging to the second reference pattern image group are images in which the same pattern repeatedly appears. That is to say, each image belonging to the second reference pattern image group is an image obtained by iterating "a" times the pattern in which an image belonging to the first reference pattern image group has been compressed to "1/a" times, where "a" is a value greater than 1, for example. A case of "a=2" is described by way of example below.

Figure 13:
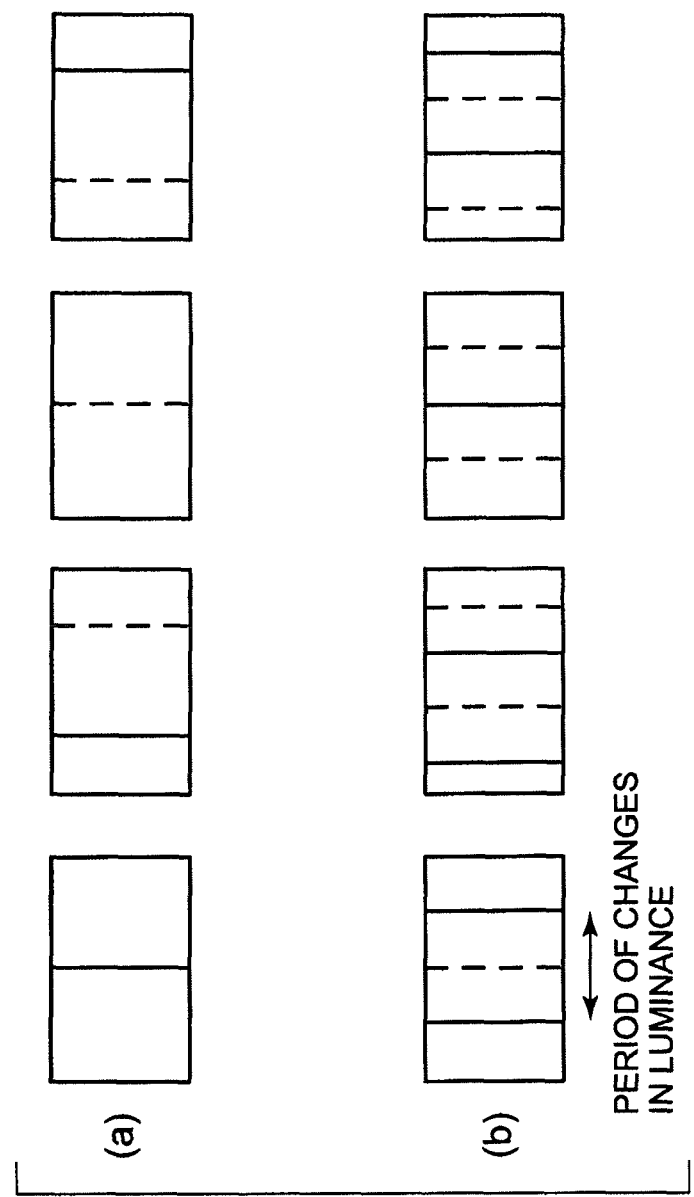
FIG. 13 It depicts an explanatory diagram schematically showing two kinds of reference pattern image groups.

FIG. 13 is an explanatory diagram schematically showing two kinds of reference pattern image groups. FIG. 13(*a*) shows a first reference pattern image group, and FIG. 13(*b*) shows a second reference pattern image group. FIG. 13 shows the case in which luminance is varied in the x-axis direction, with a solid line denoting a place in which luminance becomes minimal (i.e., the darkest location) and a dashed line denoting a place in which luminance becomes maximal (i.e., the brightest location). When image data of each reference pattern image group is calculated with "a=2", the period at which luminance changes in the second reference pattern image group is ½ times the period at which luminance changes in the first reference pattern image group, as shown in FIG. 13. In addition, each image belonging to the second reference pattern image group is an image obtained by iterating twice the pattern in which an image belonging to the first reference pattern image group has been compressed to "½" times.

The pattern phase shifting means 4 generates the first reference pattern image group in substantially the same manner as that of the reference pattern image groups described in the first exemplary embodiment. When the pattern phase shifting means 4 calculates image data of the second reference pattern image group, the shifting means uses functions that are "a" times as large as the functions (for example, the functions shown in expressions (1) and (9)) for calculating the initial phase values corresponding to particular coordinates. For example, if the pattern phase shifting means uses expressions (1) and (9) to generate the first reference pattern image group, the shifting means uses following expressions (1') and (9') to generate the second reference pattern image group.

$$s_0(x) = T/(w-1+2 \cdot m) \cdot (x-m) \cdot a \quad \text{Expression (1')}$$

$$s_0(y) = T/(h-1+2 \cdot m) \cdot (y-m') \cdot a \quad \text{Expression (9')}$$

The process of generating the first reference pattern image group and the process of generating the second reference pattern image group are substantially the same, except for the function used to calculate the initial phase value corresponding to the coordinate.

The photographing control means 5 controls the projection means 1 to project the images belonging to the first reference pattern image group, and those of the second reference pattern image group, one at a time, on the projection screen 7. The photographing control means 5 further controls the photographing means 2 to independently photograph each image projected on the projection screen 7, and then receives the photographic image from the photographing means 2.

Next on the basis of the photographic image corresponding to the first reference pattern image group, the phase calculation means 6 calculates for each pixel the initial phase value corresponding to a change in the luminance of the pixel. This process is substantially the same as that of step S13 in the first exemplary embodiment. Similarly on the basis of the photographic image corresponding to the second reference pattern image group, the phase calculation means 6 calculates for each pixel the initial phase value corresponding to a change in the luminance of the pixel.

The initial phase values that have been calculated on the basis of the photographic image corresponding to the first reference pattern image group are hereinafter referred to as the first initial phase values. Similarly, the initial phase values that have been calculated on the basis of the photographic image corresponding to the second reference pattern image group are hereinafter referred to as the second initial phase values. After the above calculations, the associating means 9 uses the first and second initial phase values to associate the coordinates calculated from the initial phase values, and the corresponding pixels in the photographic image. More specifically, the associating means 9 inversely calculates coordinates from each of the second initial phase values. If the expressions used to calculate the initial phase values during the generation of the second reference pattern image group are (1') and (9'), the coordinates are calculated by inverse operations on the expressions.

However, since, as shown in FIG. 13(b), each image belonging to the second reference pattern image group is formed by the iteration of the same pattern, indefiniteness exists in that if initial phase values are the same at different coordinates, the value of the coordinate may not be uniquely calculable from the particular initial phase value. In order to resolve the indefiniteness, the associating means 9 calculates, as candidates, coordinates obtained by adding an integer multiple of the period of the changes in the luminance in the second reference pattern image group, to the coordinate that has been obtained from inverse operation results on the second initial phase values. For example, if the coordinate obtained by the inverse operation is taken as "t" and the period of the changes in the luminance in the second reference pattern image group is taken as "Q", calculations of "t+Q, t+2Q, ..." are conducted to obtain the candidates for the coordinate that is to be derived.

In the photographic image corresponding to the first reference pattern image group, for the pixel existing at the same position as that of the pixel for which the corresponding coordinate is to be derived in the photographic image corresponding to the second reference pattern image group, the associating means 9 also inversely calculates the coordinate from the initial phase value. Of the coordinate candidates calculated from the second initial phase values, the coordinate closest to that which has been inversely calculated from the initial phase value of the pixel in the photographic image corresponding to the first reference pattern image group is determined as the coordinate that corresponds to the pixel. The associating means 9 conducts the determination. This process is repeated for each pixel.

In the present example of modification, the associating means 9 improves in associating accuracy. The measuring error of initial phase values is the same between the two reference pattern image groups, but for the second reference pattern image group, a change rate of the initial phase value with respect to the corresponding coordinate become "a" times as great, which means that an error in the calculation of the corresponding coordinate from the initial phase value is "1/a". Accordingly, associating accuracy improves.

In each of the above exemplary embodiments and the respective modifications, the correction means 10, before correcting the image to be projected by the projection means 1, may use reflectance to update the luminance of this image. In this case, the information-processing apparatus 3 will include calculation means that calculates the reflectance on the projection screen, and this reflectance calculation means may be implemented by a constituent element (e.g., the correction means 10 or phase calculation means 6) of the information-processing apparatus 3. The following describes an example in which the correction means 10 also operates as the reflectance calculation means.

The correction means 10 calculates the reflectance "$A_{cp}$" from the amplitude ("$A_p$") corresponding to luminance in the reference pattern image group generated by the pattern phase shifting means 4, and the amplitude ("$A_c$") corresponding to luminance in the image photographed by the photographing means 2. The correction means 10 obtains the reflectance "$A_{cp}$" by calculating "$A_{cp} = A_c/A_p$".

Instead of deriving the above amplitude "$A_c$" corresponding to luminance in the photographic image from the photographic image of the reference pattern image group, the correction means 10 may derive the above amplitude "$A_c$" from a differential luminance value between an image of maximum luminance and an image of minimum luminance. The latter two images are independent of the reference pattern image group and are obtained by photographing each of the two images being projected on the projection screen. In this case, the photographing control means 5 may control the projection means 1 to independently project each of a bright image having all pixels set to a maximum achievable luminance value (i.e., an image that is bright in its entirety), and a dark image having all pixels set to a minimum achievable luminance value (i.e., an image that is dark in its entirety), and then control the photographing means 2 to independently photograph each of the bright and dark images. The correction means 10 calculates the amplitude "$A_c$" from the differential luminance value between the two photographic images.

In addition, if the luminance of the image to be projected for presentation to the viewer by the projection means 1 is expressed as K, the correction means 10 updates the luminance to "$K/A_{cp}$", a value obtained by dividing the luminance K by the reflectance "$A_{cp}$". After the update of the luminance, the correction means 10 uses the pixel correspondence table to correct the image.

Although an example of providing one projection means 1 has been described in the above exemplary embodiments, the pixel position correspondence specifying system may include the projection means 1 in plurality, in which case the information-processing apparatus 3 may create an independent pixel correspondence table for each projection means 1. For image projection by the plurality of projection means 1, images to be presented to a user are corrected using the pixel correspondence tables that have been created independently for each projection means 1.

The plurality of projection means 1 may also project the respective images on the same region of the projection screen 7, in which case, since the images projected on the same region from the projection means 1 are presented to the user, the images projected on the projection screen 7 can be made bright.

Further alternatively, the plurality of projection means 1 may share the projection of individual images formed by dividing a larger image, and project each image in shifted form on the projection screen 7. For example, first projection means 1 may undertake projecting a right half of the image to be presented to the user, and second projection means 1 may undertake projecting a left half of the image. Plus, the second projection means 1 may project an image next to the region where the first projection means 1 projects another image. If this is the case, an image larger than that projected using one projection means 1 can be presented to the user.

It has also been described above that the photographing means 1 independently projects each of the images belonging to a reference pattern image group and that the photographing means 2 photographs each image projected independently. However, the projection means 1 may project a plurality of images at the same time on the projection screen, in which case the photographing means 2 may photograph the projected images and separate each image for each of colors different in wavelength of light.

Suppose that the number of projection means 1 provided is 1. In this case, the projection means 1 may simultaneously project images of a reference pattern image group, as those of the colors each different in the wavelength of the light. For example, assume that there are three images belonging to the reference pattern image group and that the projection means 1 can project the images in three colors, namely, red, green, and blue. In this example, the projection means 1 may project the first to third images at the same time in red, green, and blue, respectively. And in this case, the photographing means 2 may photograph the images projected simultaneously in red, green, and blue, and separate them according to the color. The information-processing apparatus 3 may conduct the process for the separated images.

A plurality of projection means may instead be provided, each projecting an image at the same time in any one of the colors different in the wavelength of the light. For example, three projection means 1 may be provided, in which case, image projection in red by first projection means, image projection in green by second projection means, and image projection in blue by third projection means may simultaneously occur. In addition, the photographing means 2 in this case may photograph the images simultaneously projected in red, green, and blue, and then separate the images according to the color.

In a further alternative configuration, a plurality of projection means may be provided, each projecting simultaneously a plurality of images in different colors. For example, five projection means capable of projecting light at 15 kinds of wavelengths may be provided, in which case, each projection means independently projects three kinds of images at the same time in colors of different wavelengths. Each projection means also conducts the projection simultaneously. The photographing means 2 in this case may photograph the images, one by one, that have been projected in the 15 kinds of colors of different wavelengths, and separate the images into the 15 kinds of colors.

An example in which the pixel position correspondence specifying system includes the photographing means 2 (see FIG. 1) has been described in each of the above exemplary embodiments, but the system may not include the photographing means 2. Instead, projection means that projects the image(s) projected on the projection screen 7 (see FIG. 1) may be provided independently of the pixel position correspondence specifying system. Such projection means may be, for example, a hand-held terminal with a camera. In this case, the information-processing apparatus 3 may need only to include, instead of the photographing control means 5, reference pattern projection control means that makes the projection means 1 project the images belonging to a reference pattern image group. The hand-held terminal with a camera is operated by the viewer, for example, to photograph each image of the reference pattern image group projected on the projection screen and output the image to the information-processing apparatus 3. The information-processing apparatus 3 may use the externally input plurality of photographic images to perform substantially the same operation as in each of the above exemplary embodiments.

Figure 14:
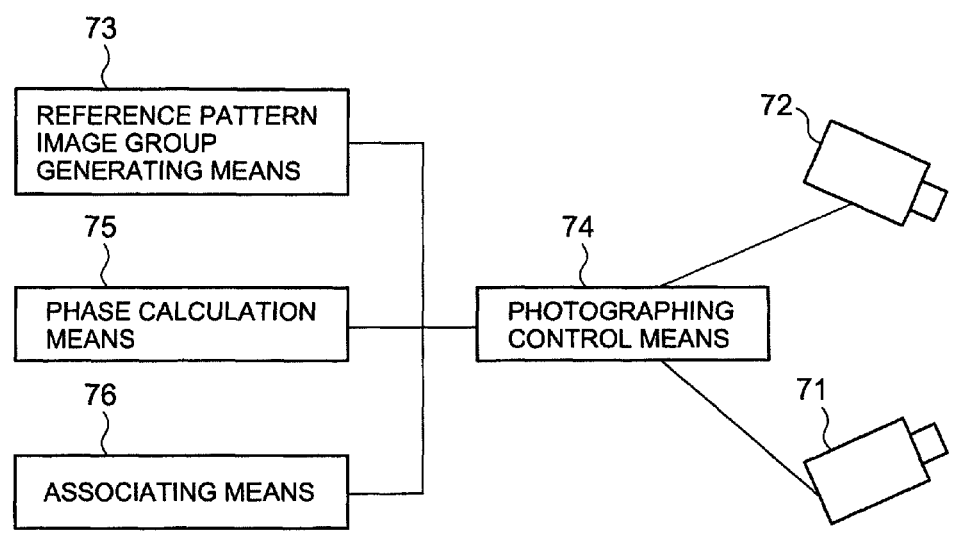
FIG. 14 It depicts a block diagram that shows an outline of the present invention.

Next, the present invention is outlined below. FIG. 14 is a block diagram that shows the outline of the invention. A pixel position correspondence specifying system according to the invention includes projection means 71 (e.g., the projection means 1 in each of the above exemplary embodiments), photographing means 72 (e.g., the photographing means 2 in each exemplary embodiment), reference pattern image group generating means 73 (e.g., the pattern phase shifting means 4), photographing control means 74 (e.g., the photographing control means 5 in each exemplary embodiment), phase calculation means 75 (e.g., the phase calculation means 6 in each of the above exemplary embodiments), and associating means 76 (e.g., the associating means 9 in each exemplary embodiment).

The projection means 71 projects an image on a projection screen. The photographing means 72 photographs the image projected on the projection screen.

The reference pattern image group generating means 73 generates reference pattern image groups, each formed from images for each of which a luminance value defined as a function value of a continuous function which continuously changes with changes in phase is determined by varying the phase for each image, the image groups each being an image group having an initial phase value continuously varied on a coordinate-by-coordinate basis along one coordinate axis.

The photographing control means 74 controls the projection means 71 to project the images belonging to the reference pattern image group, and controls the photographing means 72 to photograph the images projected on the projection screen as a result.

On the basis of changes in luminance of pixels in a plurality of photographic images obtained by the photographing means 72 when each image of the reference pattern image group is projected by the projection means 71, the phase calculation means 75 calculates initial phase values corresponding to the changes in the luminance of the respective pixels in the photographic images.

The associating means 76 conducts, upon an initial phase value calculated by the phase calculation means 75, an inverse operation of the calculation instituted by the reference pattern image group generating means to derive the initial phase value from coordinates in expression (1), for example, then associates the pixels in the photographic images and the coordinates obtained by the inverse operation, and thus specifies the correspondence between the pixels in the image to be projected and the pixels in the projection means 71.

More specifically, the reference pattern image group generating means 73 generates a reference pattern image group concerning a first coordinate axis (for example, x-axis) along which an initial phase value is changed, and a reference pattern image group concerning a second coordinate axis (for example, y-axis) along which an initial phase value is changed.

The photographing control means 74 controls the projection means 71 to project the reference pattern image group concerning the first coordinate axis, and controls the photographing means 72 to photograph each image of this reference pattern image group resultingly projected on the projection screen. The photographing control means 74 also controls the projection means 71 to project the reference pattern image group concerning the second coordinate axis, and controls the photographing means 72 to photograph each image of this reference pattern image group resultingly projected on the projection screen.

The phase calculation means 75 calculates, from changes in luminance of pixels in a plurality of photographic images obtained by the photographing means 72 when each image of the reference pattern image group for the first coordinate axis is projected by the projection means 71, the initial phase values corresponding to the changes in the luminance of the respective pixels in the photographic images, and calculates, from changes in luminance of pixels in a plurality of photographic images obtained by the photographing means when each image of the reference pattern image group for the second coordinate axis is projected by the projection means 71, the initial phase values corresponding to the changes in the luminance of the respective pixels in the photographic images.

The associating means 76 first calculates coordinates (e.g., x-coordinates) of the first coordinate axis by conducting an inverse operation of the calculation for deriving initial phase values from the coordinates of the first coordinate axis, as in expression (1), upon the initial phase values calculated from the photographic images obtained by photographing the reference pattern image group for the first coordinate axis. The associating means 76 next associates the coordinates of the first coordinate axis with the pixels in the photographic images. The associating means 76 further calculates coordinates (e.g., y-coordinates) of the second coordinate axis by conducting an inverse operation of the calculation for deriving initial phase values from the coordinates of the second coordinate axis, as in expression (9), upon the initial phase values calculated from the photographic images obtained by photographing the reference pattern image group for the second coordinate axis. The associating means 76 next associates the coordinates of the second coordinate axis with the pixels in the photographic images. The associating means 76 thus specifies the correspondence between the pixels of each photographic image and those of each image projected by the projection means 71, and uses the correspondence between the pixels and coordinates of the photographic image to specify the correspondence between the pixels in the image to be projected and pixels present in the projection means.

In addition, a configuration disclosed for the above exemplary embodiments includes correction means (e.g., the correction means 10 in each of the above exemplary embodiments) that corrects the image to be projected, on the basis of the correspondence between the pixels in the image to be projected and pixels present in the projection means 71, and projection control means (e.g., the projection control means 11 in each of the above exemplary embodiments) that controls the projection means 71 to project the image corrected by the correction means.

In another configuration disclosed for the above exemplary embodiments, the reference pattern image group generating means 73 generates the first reference pattern image group and the second reference pattern image group in which a period of the changes in the luminance in the first reference pattern image group is multiplied by a predetermined factor of, say, "1/a". Also, the photographing control means 74 controls the projection means 71 to project, in addition to the images belonging to the first reference pattern image group, the images belonging to the second reference pattern image group, and then controls the photographing means 72 to photograph each image resultingly projected on the projection screen. Additionally, the phase calculation means 75 uses the photographic image corresponding to the first reference pattern image group to calculate the initial phase values given by the changes in the luminance of each pixel, and uses the photographic image corresponding to the second reference pattern image group to calculate the initial phase values given by the changes in the luminance of each pixel. Furthermore, the associating means 76 uses both the initial phase values calculated from the photographic image corresponding to the first reference pattern image group, and the initial phase values calculated from the photographic image corresponding to the second reference pattern image group, associates the coordinates obtained from the initial phase values, and the pixels in the photographic image, the associating means further using the association to specify the correspondence between the pixels in the image to be projected and the pixels in the projection means 71. This configuration improves associating accuracy.

Yet another configuration disclosed for the above exemplary embodiments includes reflectance calculation means (e.g., the correction means 10) that calculates reflectance obtained on the projection screen, and the correction means updates the luminance value of the pixels in the image to be projected, to a value obtained by dividing the luminance value by the reflectance, and corrects the updated image.

In a further configuration disclosed for the above exemplary embodiments, the continuous function (e.g., "f") that continuously changes with changes in phase is a function that represents sinusoidal changes.

A configuration with a plurality of projection means is further disclosed.

In a further configuration disclosed for the above exemplary embodiments, the projection means 1 simultaneously projects the images belonging to a reference pattern image group, as images of colors different in wavelength of light, and the photographing means 2 photographs the projected images and separates them for each color of the different wavelengths of the light.

A pixel position correspondence specifying system of the following configuration is disclosed for the above exemplary embodiments.

This system configuration for specifying pixel position correspondence includes: projection means (e.g., the projection means 1 in the exemplary embodiments) that projects an image on a projection screen; reference pattern image group generating means (e.g., the pattern phase shifting means 4) that generates reference pattern image groups each formed from images for each of which a luminance value defined as a function value of a continuous function which continuously changes with changes in phase is determined by varying the phase for each image, the image groups each being an image group having an initial phase value continuously varied on a coordinate-by-coordinate basis along one coordinate axis; reference pattern projection control means (e.g., the photographing control means 5 in the exemplary embodiments) that controls the projection means to project the images belonging to the reference pattern image groups; phase calculation means (e.g., the phase calculation means 6 in the exemplary embodiments) that calculates, from changes in luminance of pixels in a plurality of photographic images obtained by photographing each image of the reference pattern image group projected on the projection screen, the initial phase values corresponding to the changes in the luminance of the respective pixels in the photographic images; and associating means (e.g., the associating means 9 in the exemplary embodiments) that conducts an inverse operation of a calculation instituted by the reference pattern image group generating means to derive initial phase values from coordinates, upon the initial phase values calculated by the phase calculation means, then associates the inversely calculated coordinates with the pixels in the photographic images, and specifies the correspondence between the pixels in the image to be projected and pixels present in the projection means, wherein: the reference pattern image group generating means generates a reference pattern image group for a first coordinate axis (e.g., an x-axis) along which initial phase values are varied, and a reference pattern image group for a second coordinate axis (e.g., a y-axis) along which initial phase values are varied; the reference pattern projection control means controls the projection means to project the reference pattern image group for the first coordinate axis, the projection control means further making the projection means project the reference pattern image group for the second coordinate axis; the phase calculation means calculates, from changes in luminance of pixels in a plurality of photographic images obtained by photographing each image of the reference pattern image group for the first coordinate axis, the initial phase values corresponding to the changes in the luminance of the respective pixels in the photographic images, the phase calculation means further calculating, from changes in luminance of pixels in a plurality of photographic images obtained by photographing each image of the reference pattern image group for the second coordinate axis, the initial phase values corresponding to the changes in the luminance of the respective pixels in the photographic images; and the associating means calculates coordinates of the first coordinate axis by conducting an inverse operation of a calculation for deriving initial phase values from the coordinates of the first coordinate axis, upon the initial phase values calculated from the photographic images obtained by photographing the reference pattern image group for the first coordinate axis, then associates the coordinates of the first coordinate axis with the pixels in the photographic images, next after calculating coordinates of the second coordinate axis by conducting an inverse operation of a calculation for deriving initial phase values from the coordinates of the second coordinate axis, upon the initial phase values calculated from the photographic images obtained by photographing the reference pattern image group for the second coordinate axis, associates the coordinates of the second coordinate axis with the pixels in the photographic images, the associating means thus specifying the correspondence between the pixels of each photographic image and those of an image to be projected by the projection means, and using the correspondence between the pixels and coordinates of the photographic image to specify the correspondence between the pixels in the image to be projected and pixels present in the projection means.

This configuration is equivalent to a configuration in which the photographing means 72 in FIG. 14 is provided as an external element of a pixel position correspondence specifying system.

Pixel position correspondence specifying systems of the following configurations are disclosed for the above exemplary embodiments.

(1) A pixel position correspondence specifying system includes: a projection unit (e.g., the projection means 1 in the exemplary embodiments) that projects an image on a projection screen; a photographing unit (e.g., the photographing means 2 in the exemplary embodiments) that photographs the image projected on the projection screen; a reference pattern image group generating unit (e.g., the pattern phase shifting means 4) that generates reference pattern image groups each formed from images for each of which a luminance value defined as a function value of a continuous function which continuously changes with changes in phase is determined by varying the phase for each image, the image groups each being an image group having an initial phase value continuously varied on a coordinate-by-coordinate basis along one coordinate axis; a photographing control unit (e.g., the photographing control means 5 in the exemplary embodiments) that controls the projection unit to project the images belonging to the reference pattern image groups, and further controls the photographing unit to photograph each image resultingly projected on the projection screen; a phase calculation unit (e.g., the phase calculation means 6 in the exemplary embodiments) that calculates, from changes in luminance of pixels in a plurality of photographic images obtained by the photographing unit when each image of the reference pattern image group is projected by the projection unit, the initial phase values corresponding to the changes in the luminance of the respective pixels in the photographic images; and an associating unit (e.g., the associating means 9 in the exemplary embodiments) that conducts an inverse operation of a calculation instituted by the reference pattern image group generating unit to derive initial phase values from coordinates, upon the initial phase values calculated by the phase calculation unit, then associates the inversely calculated coordinates with the pixels in the photographic images, and specifies the correspondence between the pixels in the image to be projected and pixels present in the projection unit, wherein: the reference pattern image group generating unit generates a reference pattern image group for a first coordinate axis (e.g., an x-axis) along which initial phase values are varied, and a reference pattern image group for a second coordinate axis (e.g., a y-axis) along which initial phase values are varied; the photographing control unit controls the projection unit to project the reference pattern image group for the first coordinate axis, and controls the photographing unit to photograph each image resultingly projected on the projection screen, the photographing control unit further making the projection unit project the reference pattern image group for the second coordinate axis, and making the photographing unit photograph each image resultingly projected on the projection screen; the phase calculation unit calculates, from changes in luminance of pixels in a plurality of photographic images obtained by the photographing unit when each image of the reference pattern image group for the first coordinate axis is projected by the projection unit, the initial phase values corresponding to the changes in the luminance of the respective pixels in the photographic images, the phase calculation unit further calculating, from changes in luminance of pixels in a plurality of photographic images obtained by the photographing unit when each image of the reference pattern image group for the second coordinate axis is projected by the projection unit, the initial phase values corresponding to the changes in the luminance of the respective pixels in the photographic images; and the associating unit calculates coordinates of the first coordinate axis by conducting an inverse operation of a calculation for deriving initial phase values from the coordinates of the first coordinate axis, upon the initial phase values calculated from the photographic images obtained by photographing the reference pattern image group for the first coordinate axis, then associates the coordinates of the first coordinate axis with the pixels in the photographic images, next after calculating coordinates of the second coordinate axis by conducting an inverse operation of a calculation for deriving initial phase values from the coordinates of the second coordinate axis, upon the initial phase values calculated from the photographic images obtained by photographing the reference pattern image group for the second coordinate axis, associates the coordinates of the second coordinate axis with the pixels in the photographic images, the associating unit thus specifying the correspondence between the pixels of each photographic image and those of an image to be projected by the projection unit, and using the correspondence between the pixels and coordinates of the photographic image to specify the correspondence between the pixels in the image to be projected and pixels present in the projection unit.

(2) A pixel position correspondence specifying system includes: a correction unit (e.g., the correction means 10 in the exemplary embodiments) that corrects an image to be projected, on the basis of correspondence between pixels in the image to be projected and pixels in a projection unit; and a projection control unit (e.g., the projection control means 11 in the exemplary embodiments) that controls the projection unit to project the image corrected by the correction unit.

(3) A pixel position correspondence specifying system includes: a reference pattern image group generating unit that generates a first reference pattern image group and a second reference pattern image group in which a period of changes in luminance in the first reference pattern image group is multiplied by a predetermined factor of, say, "1/a"; a photographing control unit that controls a projection unit to project the images belonging to the first reference pattern image group, and the images belonging to the second reference pattern image group, and controls a photographing unit to photograph each image resultingly projected on the projection screen; a phase calculation unit that calculates initial phase values due to changes in luminance of pixels, on the basis of the photographic image corresponding to the first reference pattern image group, and calculates initial phase values due to changes in luminance of pixels, on the basis of the photographic image corresponding to the second reference pattern image group; and an associating unit that uses both the initial phase values calculated from the photographic image corresponding to the first reference pattern image group, and the initial phase values calculated from the photographic image corresponding to the second reference pattern image group, associates the coordinates obtained from the initial phase values, and the pixels in the photographic image, the associating unit further using the association to specify the correspondence between the pixels in the image to be projected and the pixels in the projection unit.

(4) A pixel position correspondence specifying system includes: a reflectance calculation unit (e.g., the correction means 10) that calculates reflectance obtained on a projection screen, wherein the correction unit updates a luminance value of a pixel in an image to be projected, to a value obtained by dividing the luminance value by the reflectance, and corrects the updated image.

(5) A pixel position correspondence specifying system in which a continuous function (e.g., "f") that continuously changes with changes in phase is a function that represents sinusoidal changes.

(6) A pixel position correspondence specifying system includes a plurality of projection units.

(7) A pixel position correspondence specifying system in which a projection unit simultaneously projects the images belonging to a reference pattern image group, as images of colors different in wavelength of light, and in which a photographing unit photographs the projected images and separates them for each color of the different wavelengths of the light.

(8) A pixel position correspondence specifying system includes: a projection unit (e.g., the projection means 1 in the exemplary embodiments) that projects an image on a projection screen; a reference pattern image group generating unit (e.g., the pattern phase shifting means 4) that generates reference pattern image groups each formed from images for each of which a luminance value defined as a function value of a continuous function which continuously changes with changes in phase is determined by varying the phase for each image, the image groups each being an initial phase value continuously varied on a coordinate-by-coordinate basis along one coordinate axis; a reference pattern projection control unit (e.g., the photographing control means 5 in the exemplary embodiments) that controls the projection unit to project the images belonging to the reference pattern image groups; a phase calculation unit (e.g., the phase calculation means 6 in the exemplary embodiments) that calculates, from changes in luminance of pixels in a plurality of photographic images obtained by photographing each image of the reference pattern image group projected on the projection screen, the initial phase values corresponding to the changes in the luminance of the respective pixels in the photographic images; and an associating unit (e.g., the associating means 9 in the exemplary embodiments) that conducts an inverse operation of a calculation instituted by the reference pattern image group generating unit to derive initial phase values from coordinates, upon the initial phase values calculated by the phase calculation unit, then associates the inversely calculated coordinates with the pixels in the photographic images, and specifies the correspondence between the pixels in the image to be projected and pixels present in the projection unit, wherein: the reference pattern image group generating unit generates a reference pattern image group for a first coordinate axis (e.g., an x-axis) along which initial phase values are varied, and a reference pattern image group for a second coordinate axis (e.g., a y-axis) along which initial phase values are varied; the reference pattern projection control unit controls the projection unit to project the reference pattern image group for the first coordinate axis, the correction control unit further making the projection unit project the reference pattern image group for the second coordinate axis; the phase calculation unit calculates, from changes in luminance of pixels in a plurality of photographic images obtained by photographing each image of the reference pattern image group for the first coordinate axis, the initial phase values corresponding to the changes in the luminance of the respective pixels in the photographic images, the phase calculation unit further calculating, from changes in luminance of pixels in a plurality of photographic images obtained by photographing each image of the reference pattern image group for the second coordinate axis, the initial phase values corresponding to the changes in the luminance of the respective pixels in the photographic images; and the associating unit calculates coordinates of the first coordinate axis by conducting an inverse operation of a calculation for deriving initial phase values from the coordinates of the first coordinate axis, upon the initial phase values calculated from the photographic images obtained by photographing the reference pattern image group for the first coordinate axis, then associates the coordinates of the first coordinate axis with the pixels in the photographic images, next after calculating coordinates of the second coordinate axis by conducting an inverse operation of a calculation for deriving initial phase values from the coordinates of the second coordinate axis, upon the initial phase values calculated from the photographic images obtained by photographing the reference pattern image group for the second coordinate axis, associates the coordinates of the second coordinate axis with the pixels in the photographic images, the associating unit thus specifying the correspondence between the pixels of each photographic image and those of the image projected by the projection unit, and using the correspondence between the pixels and coordinates of the photographic image to specify the correspondence between the pixels in the image to be projected and pixels present in the projection unit.

The configuration described in above item (8) is equivalent to a configuration in which the photographing means 72 in FIG. 14 is provided as an external element of a pixel position correspondence specifying system.

Image correction systems of the following configurations are disclosed for the above exemplary embodiments.

(9) An image correction system includes correction means (e.g., the correction means 10) that corrects an image to be projected by projection means, on the basis of correspondence between pixels in the image to be projected and pixels present in the projection means.

(10) An image correction system includes a correction unit (e.g., the correction means 10) that corrects an image to be projected by a projection unit, on the basis of correspondence between pixels in the image to be projected and pixels present in the projection unit.

(11) An image correction system includes a projection unit (e.g., the projection means 1 in the exemplary embodiments) that projects an image, and a projection control unit (e.g., the projection control means 11 in the exemplary embodiments) that controls the projection unit to project the image corrected by a correction unit.

The image correction systems described in above item (9) and (10) include, for example, the correction means 10 (see FIG. 10 or 11).

While the present invention has been described with reference to the above exemplary embodiments, the invention is not limited to the exemplary embodiments. Various modifications and changes that are easily understandable to persons skilled in the art can be made to the configuration and details of the invention, within the scope of the invention.

This application claims the priority based on Japanese Patent Application No. 2008-293535 filed on Nov. 17, 2008, the disclosure of which is hereby incorporated by reference in its entirety.

INDUSTRIAL APPLICABILITY

The present invention is suitably applied to a pixel position correspondence specifying system designed so that in order to correct image distortion during image projection on a projection screen, the system defines correspondence between pixels in an image to be projected and those of an image actually projected on the projection screen. The invention is also suitably applied to an image projection system that uses the correspondence to correct and project the image to be presented to a viewer.

| Reference Signs List | |
|---|---|
| 1 | Projection means |
| 2 | Photographing means |
| 3 | Information-processing apparatus |
| 4 | Pattern phase shifting means |
| 5 | Photographing control means |
| 6 | Phase calculation means |
| 7 | Projection screen |
| 8 | Viewer |
| 9 | Associating means |
| 10 | Correction means |
| 11 | Projection control means |
| 12 | Resolution converting means |

The invention claimed is:

1. A pixel position correspondence specifying system, comprising:

a projection unit that projects an image on a projection screen;

a photographing unit that photographs the image projected on the projection screen;

a reference pattern image group generating unit that generates reference pattern image groups each formed from images for each of which a luminance value defined as a function value of a continuous function which continuously changes with changes in phase is determined by varying the phase for each image, the image groups each being an image group having an initial phase value continuously varied on a coordinate-by-coordinate basis along one coordinate axis;

a photographing control unit that makes the projection unit project the images belonging to the reference pattern image group, and makes the photographing unit to photograph each image resultingly projected on the projection screen;

a phase calculation unit that calculates the initial phase values that correspond to changes in luminance of respective pixels in a plurality of photographic images obtained by the photographing unit by using changes in luminance of pixels in the plurality of photographic images when each image of the reference pattern image group is projected by the projection unit; and an associating unit that conducts an inverse operation of a calculation instituted by the reference pattern image group generating unit upon the initial phase values calculated by the phase calculation unit to derive initial phase values from coordinates, then associates the pixels in the photographic images and the coordinates obtained by the inverse operation, and thus specifies correspondence between pixels in the image to be projected and the pixels in the projection unit, wherein: the reference pattern image group generating unit generates a reference pattern image group concerning a first coordinate axis along which initial phase values are varied, and a reference pattern image group concerning a second coordinate axis along which an initial phase value is changed;

the photographing control unit makes the projection unit project the reference pattern image group concerning the first coordinate axis, and makes the photographing unit photograph each image resultingly projected on the projection screen, the photographing control unit further making the projection unit project the reference pattern image group concerning the second coordinate axis, and making the photographing unit photograph each image resultingly projected on the projection screen;

the phase calculation unit calculates, from changes in luminance of pixels in a plurality of photographic images obtained by the photographing unit when each image of the reference pattern image group relating to the first coordinate axis is projected by the projection unit, the initial phase values corresponding to the changes in the luminance of the respective pixels in the photographic images, the phase calculation unit further calculating, from changes in luminance of pixels in a plurality of photographic images obtained by the photographing unit when each image of the reference pattern image group relating to the second coordinate axis is projected by the projection unit, the initial phase values corresponding to the changes in the luminance of the respective pixels in the photographic images; and the associating unit calculates coordinates of the first coordinate axis by conducting an inverse operation of a calculation for deriving initial phase values from the coordinates of the first coordinate axis, upon the initial phase values calculated from the photographic images obtained by photographing the reference pattern image group relating to the first coordinate axis, associates the coordinates of the first coordinate axis with the pixels in the photographic images, next after calculating coordinates of the second coordinate axis by conducting an inverse operation of a calculation for deriving initial phase values from the coordinates of the second coordinate axis, upon the initial phase values calculated from the photographic images obtained by photographing the reference pattern image group relating to the second coordinate axis, associates the coordinates of the second coordinate axis with the pixels in the photographic images, the associating unit thus specifying correspondence between the pixels of each photographic image and those of each image to be projected by the projection unit, and using the correspondence between the pixels and coordinates of the photographic image to specify the correspondence between the pixels in the image to be projected and the pixels in the projection unit.

2. The pixel position correspondence specifying system according to claim 1, further comprising:

a correction unit that corrects the image to be projected, on the basis of the correspondence between the pixels in the image to be projected and the pixels in the projection unit; and a photographing control unit that makes the projection unit project the image corrected by the correction unit.

3. The pixel position correspondence specifying system according to claim 1, wherein: the reference pattern image group generating unit generates a first reference pattern image group and a second reference pattern image group in which a period of the changes in the luminance in the first reference pattern image group is multiplied by a predetermined factor;

the photographing control unit makes the projection unit project the images belonging to the first reference pattern image group, and the images belonging to the second reference pattern image group, and makes the photographing unit photograph each image resultingly projected on the projection screen;

the phase calculation unit calculates initial phase values due to the changes in the luminance of pixels, on the basis of the photographic image corresponding to the first reference pattern image group, and calculates initial phase values due to the changes in the luminance of pixels, on the basis of the photographic image corresponding to the second reference pattern image group; and the associating unit uses both the initial phase values calculated from the photographic image corresponding to the first reference pattern image group, and the initial phase values calculated from the photographic image corresponding to the second reference pattern image group, to associate the pixels in the photographic image and the coordinates obtained from the initial phase values, the associating unit further using the association to specify the correspondence between the pixels in the image to be projected and the pixels in the projection unit.

4. The pixel position correspondence specifying system according to claim 2, further comprising:

a reflectance calculation unit that calculates reflectance obtained on the projection screen, wherein the correction unit updates a luminance value of a pixel in the image to be projected, to a value obtained by dividing the luminance value by the reflectance, and corrects the updated image.

5. The pixel position correspondence specifying system according to any one of claim 1, wherein the continuous function that continuously changes with changes in phase is a function that represents sinusoidal changes.

6. The pixel position correspondence specifying system according to any one of claim 1, further comprising:

a plurality of projection unit.

7. The pixel position correspondence specifying system according to any one of claim 1, wherein: the projection unit simultaneously projects the images belonging to a reference pattern image group, as images of colors different in wavelength of light; and the photographing unit photographs the projected images and separates the images for each color of the different wavelengths of the light.

8. A pixel position correspondence specifying system, comprising:

a projection unit that projects an image on a projection screen;

a reference pattern image group generating unit that generates reference pattern image groups each formed from images for each of which a luminance value defined as a function value of a continuous function which continuously changes with changes in phase is determined by varying the phase for each image, the image groups each being an image group having an initial phase value continuously varied on a coordinate-by-coordinate basis along one coordinate axis;

a reference pattern projection control unit that makes the projection unit project the images belonging to the reference pattern image groups;

a phase calculation unit that calculates, from changes in luminance of pixels in a plurality of photographic images obtained by photographing each image of the reference pattern image group projected on the projection screen, the initial phase values that correspond to the changes in the luminance of the respective pixels in the photographic images; and an associating unit that conducts an inverse operation of a calculation instituted by the reference pattern image group generating unit to derive initial phase values from coordinates, upon the initial phase values calculated by the phase calculation unit, then associates the inversely calculated coordinates with the pixels in the photographic images, and thus specifies correspondence between pixels in the image to be projected and pixels present in the projection unit, wherein: the reference pattern image group generating unit generates a reference pattern image group concerning a first coordinate axis along which initial phase values are varied, and a reference pattern image group concerning a second coordinate axis along which initial phase values are varied;

the reference pattern projection control unit makes the projection unit project the reference pattern image group for the first coordinate axis, the projection control unit further making the projection unit project the reference pattern image group for the second coordinate axis;

the phase calculation unit calculates, from changes in luminance of pixels in a plurality of photographic images obtained by photographing each image of the reference pattern image group for the first coordinate axis, the initial phase values corresponding to the changes in the luminance of the respective pixels in the photographic images, the phase calculation unit further calculating, from changes in luminance of pixels in a plurality of photographic images obtained by photographing each image of the reference pattern image group for the second coordinate axis, the initial phase values corresponding to the changes in the luminance of the respective pixels in the photographic images; and the associating unit calculates coordinates of the first coordinate axis by conducting an inverse operation of a calculation for deriving initial phase values from the coordinates of the first coordinate axis, upon the initial phase values calculated from the photographic images obtained by photographing the reference pattern image group for the first coordinate axis, then associates the coordinates of the first coordinate axis with the pixels in the photographic images, next after calculating coordinates of the second coordinate axis by conducting an inverse operation of a calculation for deriving initial phase values from the coordinates of the second coordinate axis, upon the initial phase values calculated from the photographic images obtained by photographing the reference pattern image group for the second coordinate axis, associates the coordinates of the second coordinate axis with the pixels in the photographic images, the associating unit thus specifying the correspondence between the pixels of each photographic image and those of the image to be projected by the projection unit, and using the correspondence between the pixels and coordinates of the photographic image to specify the correspondence between the pixels in the image to be projected and the pixels in the projection unit.

9. A pixel position correspondence specifying method, comprising:

generating a reference pattern image group for a first coordinate axis, formed from images for each of which a luminance value defined as a function value of a continuous function which continuously changes with changes in phase is determined by varying the phase for each image, the image groups each being an image group having an initial phase value continuously varied on a coordinate-by-coordinate basis along the first coordinate axis;

making a projection unit project the images belonging to the reference pattern image group for the first coordinate axis, and making a photographing unit photograph each image resultingly projected on a projection screen;

calculating, from changes in luminance of pixels in a plurality of photographic images obtained by the photographing unit when each image of the reference pattern image group for the first coordinate axis is projected by the projection unit, the initial phase values that correspond to the changes in the luminance of the respective pixels in the photographic images;

conducting, upon the initial phase values calculated from the changes in the luminance of the pixels in the photographic images, an inverse operation of a calculation instituted to derive initial phase values from coordinates of the first coordinate axis in the step of generating the reference pattern image group for the first coordinate axis, and then associating the pixels in each photographic image and the coordinates of the first coordinate axis obtained by the inverse operation;

generating a reference pattern image group for a second coordinate axis, formed from images for each of which a luminance value defined as a function value of a continuous function which continuously changes with changes in phase is determined by varying the phase for each image, the image groups each having an initial phase value continuously varied on a coordinate-by-coordinate basis along the second coordinate axis;

making the projection unit project the images belonging to the reference pattern image group for the second coordinate axis, and making the photographing unit photograph each image resultingly projected on the projection screen;

calculating, from changes in luminance of pixels in a plurality of photographic images obtained by the photographing unit when each image of the reference pattern image group for the second coordinate axis is projected by the projection unit, the initial phase values that correspond to the changes in the luminance of the respective pixels in the photographic images;

conducting, upon the initial phase values calculated from the changes in the luminance of the pixels in the photographic images, an inverse operation of a calculation instituted to derive initial phase values from coordinates of the second coordinate axis in the step of generating the reference pattern image group for the second coordinate axis, and then associating the pixels in each photographic image and the coordinates of the second coordinate axis obtained by the inverse operation; and using the correspondence between the pixels and coordinates in the photographic image to specify correspondence between pixels in the image to be projected and the pixels in the projection unit.

10. The pixel position correspondence specifying method according to claim 9, further comprising:

correcting the image to be projected, on the basis of the correspondence between the pixels in the image to be projected and the pixels in the projection unit; and making the projection unit project the corrected image.

11. A pixel position correspondence specifying method, comprising:

generating a reference pattern image group for a first coordinate axis, formed from images for each of which a luminance value defined as a function value of a continuous function which continuously changes with changes in phase is determined by varying the phase for each image, the image groups each being an image group having an initial phase value continuously varied on a coordinate-by-coordinate basis along the first coordinate axis;

making a projection unit project the images belonging to the reference pattern image group for the first coordinate axis;

calculating, from changes in luminance of pixels in a plurality of photographic images obtained by photographing the images of the reference pattern image group for the first coordinate axis projected on a projection screen, the initial phase values that correspond to the changes in the luminance of the respective pixels in the photographic images;

conducting, upon the initial phase values calculated from the changes in the luminance of the pixels in the photographic images, an inverse operation of a calculation instituted to derive initial phase values from coordinates of the first coordinate axis in the step of generating the reference pattern image group for the first coordinate axis, and then associating the pixels in each photographic image and the coordinates of the first coordinate axis obtained by the inverse operation;

generating a reference pattern image group for a second coordinate axis, formed from images for each of which a luminance value defined as a function value of a continuous function which continuously changes with changes in phase is determined by varying the phase for each image, the image groups each having an initial phase value continuously varied on a coordinate-by-coordinate basis along the second coordinate axis;

making the projection unit project the images belonging to the reference pattern image group for the second coordinate axis;

calculating, from changes in luminance of pixels in a plurality of photographic images obtained by photographing the images of the reference pattern image group for the second coordinate axis projected on the projection screen, the initial phase values that correspond to the changes in the luminance of the respective pixels in the photographic images;

conducting, upon the initial phase values calculated from the changes in the luminance of the pixels in the photographic images, an inverse operation of a calculation instituted to derive initial phase values from coordinates of the second coordinate axis in the step of generating the reference pattern image group for the second coordinate axis, and then associating the pixels in each photographic image and the coordinates of the second coordinate axis obtained by the inverse operation; and using the correspondence between the pixels and coordinates in the photographic image to specify correspondence between pixels in the image to be projected and the pixels in the projection unit.

12. A non-transitory computer-readable information recording medium storing a pixel position correspondence specifying program installed on a computer equipped with projection means to project an image on a projection screen and with photographing means to photograph the image projected on the projection screen, the program causing the computer execute:

a first reference-pattern image group generating process for generating a reference pattern image group for a first coordinate axis, formed from images for each of which a luminance value defined as a function value of a continuous function which continuously changes with changes in phase is determined by varying the phase for each image, the image groups each being an image group having an initial phase value continuously varied on a coordinate-by-coordinate basis along the first coordinate axis;

a first photographing control process for making the projection means project the images belonging to the reference pattern image group for the first coordinate axis, and the photographing means to photograph each image resultingly projected on the projection screen;

a first phase calculation process for calculating, from changes in luminance of pixels in a plurality of photographic images obtained by the photographing means when each image of the reference pattern image group relating to the first coordinate axis is projected by the projection means, the initial phase values that correspond to the changes in the luminance of the respective pixels in the photographic images;

a first associating process for conducting, upon the initial phase values calculated in the first phase calculation process, an inverse operation of a calculation instituted to derive initial phase values from coordinates of the first coordinate axis in the first reference-pattern image group generating process, and then associating the pixels in each photographic image and the coordinates of the first coordinate axis obtained by the inverse operation;

a second reference-pattern image group generating process for generating a reference pattern image group for a second coordinate axis, formed from images for each of which a luminance value defined as a function value of a continuous function which continuously changes with changes in phase is determined by varying the phase for each image, the image groups each being an image group having an initial phase value continuously varied on a coordinate-by-coordinate basis along the second coordinate axis;

a second photographing control process for making the projection means to project the images belonging to the reference pattern image group for the second coordinate axis, and the photographing means to photograph each image resultingly projected on the projection screen;

a second phase calculation process for calculating, from changes in luminance of pixels in a plurality of photographic images obtained by the photographing means when each image of the reference pattern image group relating to the second coordinate axis is projected by the projection means, the initial phase values that correspond to the changes in the luminance of the respective pixels in the photographic images;

a second associating process for conducting, upon the initial phase values calculated in the second phase calculation process, an inverse operation of a calculation instituted to derive initial phase values from coordinates of the second coordinate axis in the second reference-pattern image group generating process, and then associating the pixels in each photographic image and the coordinates of the second coordinate axis obtained by the inverse operation; and a pixel associating process for using the correspondence between the pixels and coordinates in the photographic image to specify correspondence between pixels in the image to be projected and the pixels in the projection means.

13. The non-transitory computer-readable information recording medium storing the pixel position correspondence specifying program according to claim 12, the program causing the computer further execute:

a process for correcting the image to be projected, on the basis of the correspondence between the pixels in the image to be projected and the pixels in the projection means; and a projection control process for making the projection means project the image corrected in the correction process.

14. A non-transitory computer-readable information recording medium storing a pixel position correspondence specifying program installed on a computer equipped with projection means to project an image on a projection screen, the program causing the computer execute:

- a first reference-pattern image group generating process for generating a reference pattern image group for a first coordinate axis, formed from images for each of which a luminance value defined as a function value of a continuous function which continuously changes with changes in phase is determined by varying the phase for each image, the image groups each being an image group having an initial phase value continuously varied on a coordinate-by-coordinate basis along the first coordinate axis;
- a first reference-pattern projection control process for making the projection means project the images belonging to the reference pattern image group for the first coordinate axis;
- a first phase calculation process for calculating, from changes in luminance of pixels in a plurality of photographic images obtained by photographing each image of the reference pattern image group for the first coordinate axis projected on the projection screen, the initial phase values that correspond to the changes in the luminance of the respective pixels in the photographic images;
- a first associating process for conducting, upon the initial phase values calculated in the first phase calculation process, an inverse operation of a calculation instituted to derive initial phase values from coordinates of the first coordinate axis in the first reference-pattern image group generating process, and then associating the pixels in each photographic image and the coordinates of the first coordinate axis obtained by the inverse operation;
- a second reference-pattern image group generating process for generating a reference pattern image group for a second coordinate axis, formed from images for each of which a luminance value defined as a function value of a continuous function which continuously changes with changes in phase is determined by varying the phase for each image, the image groups each being an image group having an initial phase value continuously varied on a coordinate-by-coordinate basis along the second coordinate axis;
- a second reference-pattern projection control process for making the projection means project the images belonging to the reference pattern image group for the second coordinate axis;
- a second phase calculation process for calculating, from changes in luminance of pixels in a plurality of photographic images obtained by photographing each image of the reference pattern image group for the second coordinate axis projected on the projection screen, the initial phase values that correspond to the changes in the luminance of the respective pixels in the photographic images;
- a second associating process for conducting, upon the initial phase values calculated in the second phase calculation process, an inverse operation of a calculation instituted to derive initial phase values from coordinates of the second coordinate axis in the second reference-pattern image group generating process, and then associating the pixels in each photographic image and the coordinates of the second coordinate axis obtained by the inverse operation; and
- a pixel associating process for using the correspondence between the pixels and coordinates in the photographic image to specify correspondence between pixels in the image to be projected and the pixels in the projection means.

* * * * *